United States Patent
Goto

(10) Patent No.: US 9,528,017 B2
(45) Date of Patent: Dec. 27, 2016

(54) INKJET INK AND INKJET RECORDING DEVICE

(71) Applicant: Hiroshi Goto, Kanagawa (JP)

(72) Inventor: Hiroshi Goto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 228 days.

(21) Appl. No.: 14/373,506

(22) PCT Filed: Jan. 25, 2013

(86) PCT No.: PCT/JP2013/052293
§ 371 (c)(1),
(2) Date: Jul. 21, 2014

(87) PCT Pub. No.: WO2013/115344
PCT Pub. Date: Aug. 8, 2013

(65) Prior Publication Data
US 2014/0368572 A1 Dec. 18, 2014

(30) Foreign Application Priority Data
Feb. 3, 2012 (JP) .................... 2012-022348

(51) Int. Cl.
*C09D 11/322* (2014.01)
*C09D 11/38* (2014.01)
(Continued)

(52) U.S. Cl.
CPC ............... *C09D 11/38* (2013.01); *C08K 5/11* (2013.01); *C08K 5/156* (2013.01); *C08K 5/1565* (2013.01);
(Continued)

(58) Field of Classification Search
CPC ..... C09D 11/10; C09D 11/322; C09D 11/326; C09D 11/38; C08K 5/11; C08K 5/1565; C08K 5/20
(Continued)

(56) References Cited

U.S. PATENT DOCUMENTS 6,232,361 B1 5/2001 Laksin et al.
7,919,544 B2 4/2011 Matsuyama et al.
(Continued)

FOREIGN PATENT DOCUMENTS

EP 2390288 A1 11/2011
JP 62-241977 10/1987
(Continued)

OTHER PUBLICATIONS

Abstract of WO 2012/124790 A1; Sep. 2012; 1 page.*
(Continued)

*Primary Examiner* — Helene Klemanski
(74) *Attorney, Agent, or Firm* — Oblon, McClelland, Maier & Neustadt, L.L.P.

(57) ABSTRACT

To provide an inkjet ink containing: a water-dispersible colorant; a surfactant; a penetrating agent; a water-dispersible resin; a wetting agent containing at least polyhydric alcohol having an equilibrium moisture content of 30% by mass or higher at 23° C., 80% RH; a compound represented by the general formula (1); water; and at least one selected from the group consisting of a compound represented by the general formulae (2) to (4), wherein the water-dispersible colorant is at least one selected from the group consisting of a self-dispersible pigment, a pigment dispersed by a pigment dispersing agent, and resin particles each containing a pigment, wherein a total amount of the water-dispersible colorant and the water-dispersible resin is 8% by mass to 35% by
(Continued)

mass, and wherein a mass ratio of the water-dispersible resin to the water-dispersible colorant is 2 to 8.

10 Claims, 2 Drawing Sheets

(51) Int. Cl.
 C08K 5/11 (2006.01)
 C08K 5/1565 (2006.01)
 C08K 5/20 (2006.01)
 C08K 5/156 (2006.01)
 C08K 5/23 (2006.01)
 C08K 5/3417 (2006.01)
 C08K 5/3437 (2006.01)

(52) U.S. Cl.
 CPC . *C08K 5/20* (2013.01); *C08K 5/23* (2013.01); *C08K 5/3417* (2013.01); *C08K 5/3437* (2013.01); *C09D 11/322* (2013.01)

(58) Field of Classification Search
 USPC ............... 106/31.75, 31.86, 31.89; 347/20
 See application file for complete search history.

(56) References Cited

U.S. PATENT DOCUMENTS

| | | | | |
|---|---|---|---|---|
| 8,109,622 | B2 | 2/2012 | Goto et al. | |
| 8,242,201 | B2 | 8/2012 | Goto et al. | |
| 8,845,800 | B2 * | 9/2014 | Gotou | C09D 11/322 106/31.43 |
| 8,883,275 | B2 * | 11/2014 | Nagashima | C09D 11/322 106/31.43 |
| 8,888,269 | B2 * | 11/2014 | Yokohama | C09D 11/38 347/100 |
| 8,945,294 | B2 * | 2/2015 | Matsuyama | C09D 11/326 106/31.86 |
| 8,961,674 | B2 * | 2/2015 | Fujii | C09D 11/322 106/31.43 |
| 9,010,918 | B2 * | 4/2015 | Gotou | C09D 11/322 347/100 |
| 9,028,600 | B2 * | 5/2015 | Goto | C09D 11/322 106/31.43 |
| 9,068,090 | B2 * | 6/2015 | Gotou | C09D 11/322 |
| 9,085,706 | B2 * | 7/2015 | Gotou | C09D 11/322 |
| 9,109,129 | B2 * | 8/2015 | Goto | C09D 11/38 |
| 2007/0197685 | A1 | 8/2007 | Aruga et al. | |
| 2007/0291071 | A1 | 12/2007 | Nakazawa et al. | |
| 2008/0233363 | A1 | 9/2008 | Goto | |
| 2010/0196601 | A1 | 8/2010 | Goto et al. | |
| 2010/0196602 | A1 | 8/2010 | Koyano et al. | |
| 2010/0295891 | A1 | 11/2010 | Goto et al. | |
| 2011/0057981 | A1 | 3/2011 | Aruga et al. | |
| 2011/0102496 | A1 | 5/2011 | Fukuda | |
| 2011/0164086 | A1 | 7/2011 | Goto et al. | |
| 2012/0098883 | A1 | 4/2012 | Matsuyama et al. | |
| 2012/0207983 | A1 | 8/2012 | Matsuyama et al. | |
| 2012/0293582 | A1 | 11/2012 | Goto et al. | |
| 2012/0320137 | A1 | 12/2012 | Fujii et al. | |
| 2013/0002776 | A1 | 1/2013 | Nagashima et al. | |
| 2013/0065028 | A1 | 3/2013 | Fujii et al. | |
| 2013/0070017 | A1 | 3/2013 | Fujii et al. | |
| 2013/0071637 | A1 | 3/2013 | Matsuyama et al. | |
| 2013/0113860 | A1 | 5/2013 | Gotou et al. | |
| 2013/0194345 | A1 | 8/2013 | Tamai et al. | |
| 2013/0321525 | A1 | 12/2013 | Fujii et al. | |
| 2014/0002539 | A1 | 1/2014 | Goto et al. | |

FOREIGN PATENT DOCUMENTS

| | | |
|---|---|---|
| JP | 2002-531678 | 9/2002 |
| JP | 2003-049096 | 2/2003 |
| JP | 2004-136458 | 5/2004 |
| JP | 2008-018711 | 1/2008 |
| JP | 2008-163238 | 7/2008 |
| JP | 2009-052018 | 3/2009 |
| JP | 2009-287014 | 12/2009 |
| JP | 2010-168433 | 8/2010 |
| JP | 2011-068838 | 4/2011 |
| JP | 2011-074277 | 4/2011 |
| JP | 2011-246570 | 12/2011 |
| JP | 2012-107210 | 6/2012 |
| JP | 2012-207202 | 10/2012 |

OTHER PUBLICATIONS

English translation of JP 2010/168433, Aug. 2010; 10 pages.*
International Search Report Issued Mar. 12, 2013 for counterpart International Patent Application No. PCT/JP2013/052293 filed Jan. 25, 2013.
Office Action ssued Sep. 6, 2016, in corresponding Japanese Patent Application No. 2013-010510.

* cited by examiner

INKJET INK AND INKJET RECORDING DEVICE

TECHNICAL FIELD

The present invention relates to an inkjet ink and an inkjet recording device.

BACKGROUND ART

An inkjet recording device is a device for forming an image by ejecting a small amount of an ink utilizing bubbles generated by heat, piezoelectric, or electrostatics, to deposit the ink on a recording medium, such as paper, followed by drying the ink.

Recently, there have been high demands of inkjet recording devices for industrial use, and inkjet recording devices that can be correspond to high speed printing and use of various recording mediums are desired. As printing speed increases, an inkjet printer equipped with a line head is desired.

Moreover, in view of environmental friendliness and safety, there are needs for aqueous inkjet inks.

PTL 1 discloses an aqueous ink composition containing a pigment, water, an organic solvent, a resin, and a surface adjusting agent for the ink composition, in which the organic solvent is a compound represented by the following general formula:

$$R^1OCH_2CH_2CONR^2R^3$$

(where $R^1$ is a C1-C8 alkyl group; and $R^2$ and $R^3$ are each independently a hydrogen atom, a C1-C6 alkyl group, or a group containing an ether bond in a C1-C6 alkyl group), and in which an amount of the organic solvent is 10% by mass to 49% by mass relative to a total amount of the water and the organic solvent.

However, an image having a large deposition amount of the aqueous ink, such as a photograph, and figure, is printed on a commercial printing sheet, glossiness and smear fixing ability cannot be attained at the same time as preventing cockling and beading. Accordingly, it is currently desired to provide an inkjet ink that can attains glossiness and smear fixing ability at the same time as preventing cockling and beading, when an image having a large deposition amount of an aqueous ink, such as a photograph, and figure, is formed on a commercial printing sheet.

CITATION LIST

Patent Literature

PTL 1; Japanese Patent Application Laid-Open (JP-A) No. 2011-68838

SUMMARY OF INVENTION

Technical Problem

The present invention aims to solve the various problems in the art and to achieve the following object. An object of the present invention is to provide an inkjet ink that has excellent glossiness and smear fixing ability and is capable of preventing occurrences of cockling and beading even when an image having a large deposition amount of the inkjet ink is formed on a commercial printing sheet.

Solution to Problem

The means for solving the aforementioned problem are as follows:

The inkjet ink of the present invention contains:

An inkjet ink containing:
a water-dispersible colorant;
a surfactant;
a penetrating agent;
a water-dispersible resin;
a wetting agent containing at least polyhydric alcohol having an equilibrium moisture content of 30% by mass or higher at 23° C., 80% RH;
a compound represented by the following general formula (1);
water; and
at least one selected from the group consisting of a compound represented by the following general formula (2), a compound represented by the following general formula (3), and a compound represented by the following general formula (4), wherein the water-dispersible colorant is at least one selected from the group consisting of a self-dispersible pigment, a pigment dispersed by a pigment dispersing agent, and resin particles each containing a pigment, wherein a total amount of the water-dispersible colorant and the water-dispersible resin is 8% by mass to 35% by mass, and wherein a mass ratio of the water-dispersible resin to the water-dispersible colorant is 2 to 8:

General Formula (1)

$$R_1OCH_2CH_2-\overset{O}{\underset{\|}{C}}-N\overset{CH_3}{\underset{CH_3}{\diagdown}}$$

where $R_1$ is a C4-C6 alkyl group,

General Formula (2)

$$\text{HOH}_2C-\underset{O}{\overset{O}{\diagdown}}\underset{R_3}{\overset{R_2}{\diagdown}}$$

where $R_2$ is a hydrogen atom, a methyl group, or an ethyl group, and $R_3$ is a C1-C4 alkyl group, General Formula (3)

$$O\diagup\square\diagdown\underset{CH_2OR_5}{\overset{R_4}{}}$$

where $R_4$ is either a methyl group or an ethyl group, and $R_5$ is a hydroxyl group, a C1-C8 alkyl group, a cycloalkyl group, or an aryl group, General Formula (4)

$$R_6O-\overset{O}{\underset{\|}{C}}-(CH_2)_8-\overset{O}{\underset{\|}{C}}-OR_7$$

where $R_6$ and $R_7$ are each independently a C1-C8 alkyl group.

Advantageous Effects of Invention

The present invention can solve the aforementioned various problems in the art, and can provide an inkjet ink that has excellent glossiness and smear fixing ability and is capable of preventing occurrences of cockling and beading even when an image having a large deposition amount of the inkjet ink is formed on a commercial printing sheet.

DESCRIPTION OF EMBODIMENTS (Inkjet Ink)

Figure 1:
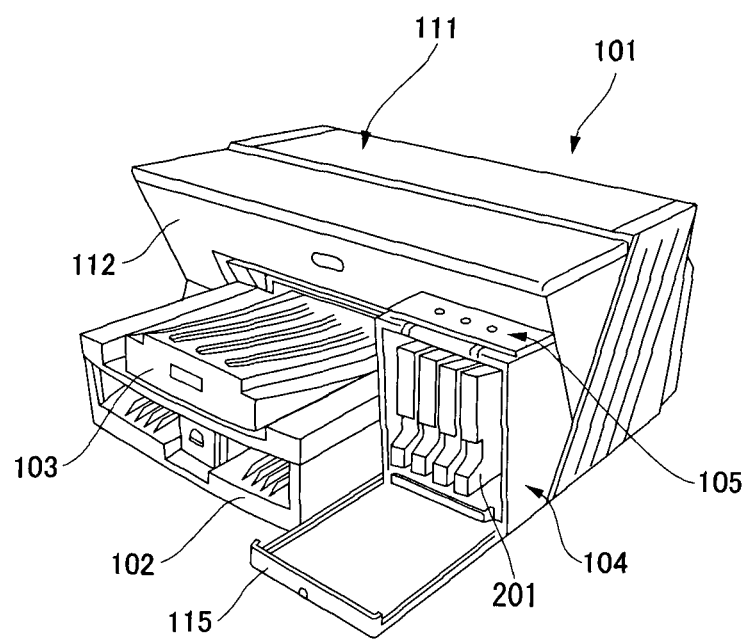
FIG. 1 is a projected view for explaining an inkjet recording device in the state where a cover of an ink cartridge loading area opens.

The inkjet ink contains: a water-dispersible colorant; a surfactant; a penetrating agent; a water-dispersible resin, a wetting agent containing at least polyhydric alcohol having an equilibrium moisture content of 30% by mass or greater at 23° C., 80% RH; a compound represented by the general formula (1); water; and at least one selected from the group consisting of a compound represented by the general formula (2), a compound represented by the general formula (3), and a compound represented by the general formula (4). The inkjet ink may further contain 3-methoxy-N,N-dimethylpropionamide, and other components, if necessary.

The water-dispersible colorant is a self-dispersible pigment, a pigment dispersed with a pigment dispersing agent, or resin particles each containing a pigment.

A total amount of the pigment and the water-dispersible resin in the inkjet ink is 8% by mass to 35% by mass. When the total amount thereof is smaller than 8% by mass, glossiness and smear fixing ability are impaired as an image having a large deposition amount of the inkjet ink is formed on a commercial printing sheet. When the total amount thereof is greater than 35% by mass, a resulting ink has low jet stability.

A mass ratio of the water-dispersible resin to the pigment is 2 to 8. When the mass ratio thereof is less than 2, glossiness as obtained is low when an image having a large deposition amount of the inkjet ink is formed on a commercial printing sheet. When the mass ratio thereof is more than 8, a resulting ink has low jet stability.

The inkjet ink contains at least one selected from the group consisting of the compounds represented by the general formulae (2) to (4), together with the compound represented by the general formula (1), and therefore occurrences of cockling and beading inkjet ink can be prevented when an image having a large deposition amount of the inkjet ink is formed on a commercial printing sheet.

<Compound Represented by General Formula (1)>

The compound represented by the general formula (1) is appropriately selected depending on the intended purpose without any limitation, and examples thereof include compounds represented by the following chemical formulae (1-1) to (1-3). These may be used alone or in combination.

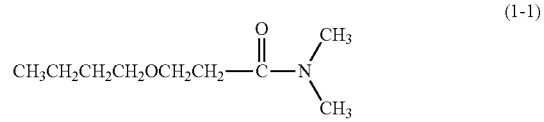

(1-1)

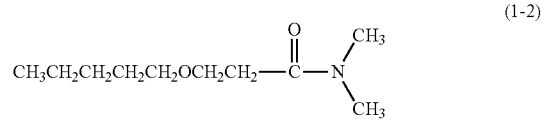

(1-2)

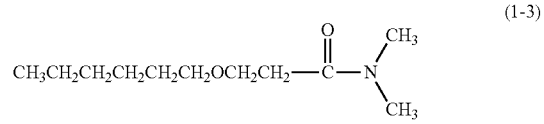

(1-3)

<Compound Represented by General Formula (2)>

The compound represented by the general formula (2) is appropriately selected depending on the intended purpose without any limitation, and examples thereof include compounds represented by the following chemical formulae (2-1) to (2-4). These may be used alone or in combination.

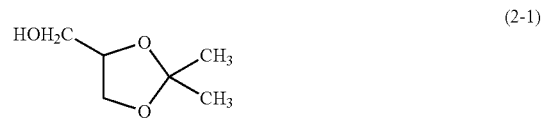

(2-1)

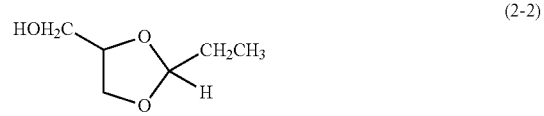

(2-2)

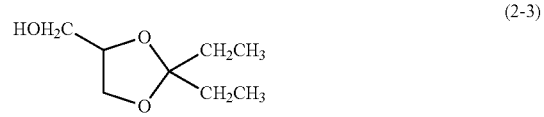

(2-3)

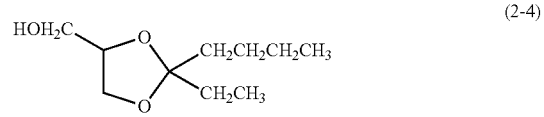

(2-4)

<Compound Represented by General Formula (3)>

The compound represented by the general formula (3) is appropriately selected depending on the intended purpose without any limitation, and examples thereof include compounds represented by the following chemical formulae (3-1) to (3-6). These may be used alone or in combination.

(3-1)

(3-2)

(3-3)

-continued

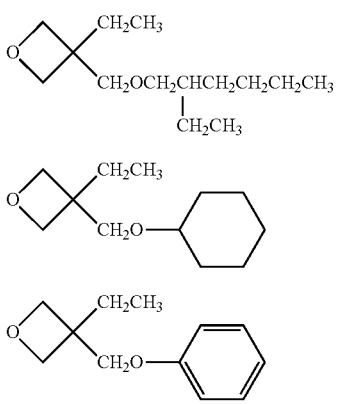

The compound represented by the general formula (4) is appropriately selected depending on the intended purpose without any limitation, and examples thereof include compounds represented by the following chemical formulae (4-1) to (4-5). These may be used alone or in combination.

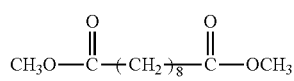

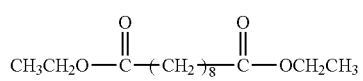

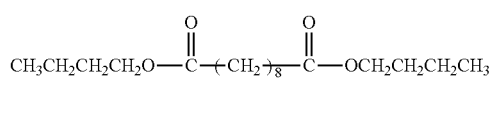

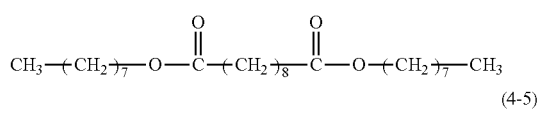

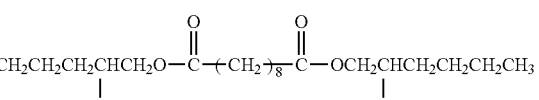

A total amount of the compounds represented by the general formulae (1) to (4) contained in the inkjet ink is preferably 1% by mass to 50% by mass, more preferably 2% by mass to 40% by mass. When the total amount thereof is smaller than 1% by mass, cockling or beading may be caused, as an image having a large deposition amount of an inkjet ink is formed on a commercial printing sheet. When the total amount thereof is greater than 50% by mass, jet stability of a resulting ink may be impaired.

<3-methoxy-N,N-dimethylpropionamide>

The inkjet ink preferably further contains a compound (3-methoxy-N,N-dimethylpropionamide) represented by the following chemical formula:

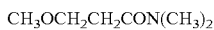

The 3-methoxy-N,N-dimethylpropionamide has a high boiling point (i.e., 216° C.), high equilibrium moisture content (i.e., 39.2% by mass) at 23° C., 80% RH, and very low viscosity (1.48 mPa·s) at 25° C. Moreover, the 3-methoxy-N,N-dimethylpropionamide is very easily dissolved in the compounds represented by the general formulae (1) to (4) and in water. Accordingly, the 3-methoxy-N,N-dimethylpropionamide can reduce the viscosity of the inkjet ink, and therefore improves jet stability of the ink.

An amount of the 3-methoxy-N,N-dimethylpropionamide in the inkjet ink is preferably 1% by mass to 50% by mass, more preferably 2% by mass to 40% by mass. When the amount thereof is smaller than 1% by mass, jet stability may be insufficient. When the amount thereof is greater than 50% by mass, cockling or beading may be caused, as an image having a large deposition amount of an inkjet ink is formed on a commercial printing sheet.

<Water>

The water is appropriately selected depending on the intended purpose without any limitation, and examples thereof include pure water or ultra-pure water, such as ion-exchanged water, ultrafiltered water, Milli-Q water, and distilled water. These may be used alone or in combination.

<Wetting Agent>

The wetting agent contains at least polyhydric alcohol having an equilibrium moisture content of 30% by mass or greater at 23° C., 80% RH, and may further contain other wetting agent, if necessary.

The wetting agent may be composed of polyhydric alcohol having an equilibrium moisture content of 30% by mass or greater at 23° C., 80% RH, alone.

<<Polyhydric Alcohol Having Equilibrium Moisture Content of 30% by Mass or Greater at 23° C., 80% RH>>

The polyhydric alcohol having an equilibrium moisture content of 30% by mass or greater at 23° C., 80% RH (may simply referred to as "polyhydric alcohol" hereinafter) is appropriately selected depending on the intended purpose without any limitation, and examples thereof include 1,2,3-butanetriol (38% by mass), 1,2,4-butanetriol (41% by mass), glycerin (49% by mass), diglycerin (38% by mass), triethylene glycol (39% by mass), tetraethylene glycol (37% by mass), diethylene glycol (43% by mass), and 1,3-butanediol (35% by mass). These may be used alone or in combination. As for the polyhydric alcohol, among the above-listed polyhydric alcohol compounds, glycerin and 1,3-butanediol are preferable. Note that, the value in the parenthesis above denotes the equilibrium moisture content at 23° C., 80% RH.

An amount of the polyhydric alcohol in the inkjet ink is preferably 2% by mass to 50% by mass, more preferably 5% by mass to 40% by mass. When the amount thereof is smaller than 2% by mass, jet stability may be insufficient. When the amount thereof is greater than 50% by mass, cockling or beading may be caused, as an image having a large deposition amount of an inkjet ink is formed on a commercial printing sheet.

The equilibrium moisture content of the polyhydric alcohol can be determined by storing a Petri dish in which 1 g of the polyhydric alcohol is weight and placed in a desiccator where the internal temperature and humidity are maintained at 23° C.±1° C., and 80% RH±3% RH, respectively, using a saturated aqueous solution of potassium chloride/sodium chloride. The equilibrium moisture content of the polyhydric alcohol can be then calculated by the following formula:

(Mass of moisture absorbed by polyhydric alcohol)/
(Mass of polyhydric alcohol+Mass of moisture
absorbed by polyhydric alcohol)×100

<<Other Wetting Agents>>

Examples of other wetting agents include: polyhydric alcohol having the equilibrium moisture content of less than 30% by mass at 23° C., 80% RH, such as dipropylene glycol, 1,5-pentanediol, propylene glycol, 2-methyl-2,4-pentanediol, ethylene glycol, tripropylene glycol, hexylene glycol, polyethylene glycol, polypropylene glycol, 1,10-hexanediol, 1,2,10-hexanetriol, trimethylol ethane, and trimethylol propane; polyhydric alcohol alkyl ether, such as ethylene glycol monoethyl ether, ethylene glycol monobutyl ether, diethylene glycol monomethyl ether, diethylene glycol monoethyl ether, diethylene glycol monobutyl ether, ethylene glycol mono-2-ethylhexyl ether, and propylene glycol monoethyl ether; polyhydric alcohol aryl ether, such as ethylene glycol monophenyl ether, and ethylene glycol monobenzyl ether; a nitrogen-containing heterocyclic compound, such as 2-pyrrolidone, N-methyl-2-pyrrolidone, 1,3-dimethyl-2-imidazolidinone, ε-caprolactam, and γ-butyrolactone; amide, such as formamide, N-methylformamide, N,N-dimethylformamide, and N,N-diethylformamide; amine, such as monoethanol amine, diethanol amine, triethanol amine, N,N-dimethyl monoethanol amine, N-methyl diethanol amine, N-methyl ethanol amine, N-phenyl ethanol amine, and 3-aminopropyl diethyl amine; a sulfur-containing compound, such as dimethyl sulfoxide, sulfolane, and thiodiglycol; and others such as propylene carbonate, and ethylene carbonate. These may be used alone or in combination.

As for the aforementioned other wetting agents, saccharides and derivatives thereof are suitably used.

—Saccharides and Derivatives Thereof—

The saccharides are appropriately selected depending on the intended purpose without any limitation, and examples thereof include: monosaccharides, such as glucose, mannose, fructose, ribose, xylose, arabinose, and galactose; disaccharides, such as maltose, cellobiose, lactose, sucrose, and trahalose; oligosaccharides, such as maltotriose; and polysaccharide, such as α-cyclodextrin, and cellulose. These may be used alone or in combination.

Examples of the derivatives of the saccharides include: reducing sugars of saccharides, such as sugar alcohol (e.g., maltitol, and sorbitol); oxidized sugar obtained with aldonic acid or uronic acid; and others such as amino acid, and thio acid. These may be used alone or in combination.

<Water-Dispersible Resin>

The state of the water-dispersible resin in water is emulsion, which may be a single layer-structure emulsion, core-shell emulsion, or power feed emulsion.

The water-dispersible resin is appropriately selected depending on the intended purpose without any limitation, and examples thereof include: a condensate-based synthesized resin, such as polyester, polyurethane, an epoxy resin, polyamide, polyether, a (meth)acryl resin, an acryl-silicone resin, and a fluororesin; an addition-based synthesized resin, such as polyolefin, a polystyrene-based resin, a polyvinyl alcohol-based resin, a polyvinyl ester-based resin, a polyacrylic acid-based resin, and an unsaturated carboxylic acid-based resin; and a natural polymer, such as cellulose, rosin, and natural rubber. These may be used alone or in combination. Among those listed above, the acryl-silicone resin and the fluororesin are preferable as the water-dispersible resin.

<<Fluororesin>>

The fluororesin is preferably a fluororesin having a constitutional unit derived from fluoroolefin, more preferably a fluororesin having a constitutional unit derived from fluoroolefin and a constitutional unit derived from vinyl ether, and even more preferably n alternating copolymer of fluoroolefin and vinyl ether.

—Constitutional Unit Derived From Fluoroolefin—

The constitutional unit derived from fluoroolefin is appropriately selected depending on the intended purpose without any limitation, and examples thereof include the constitutional unit represented by the following formulae:

—Constitutional Unit Derived from Vinyl Ether—

The constitutional unit derived from vinyl ether is appropriately selected depending on the intended purpose without any limitation, and examples thereof include the constitutional unit represented by the following formulae:

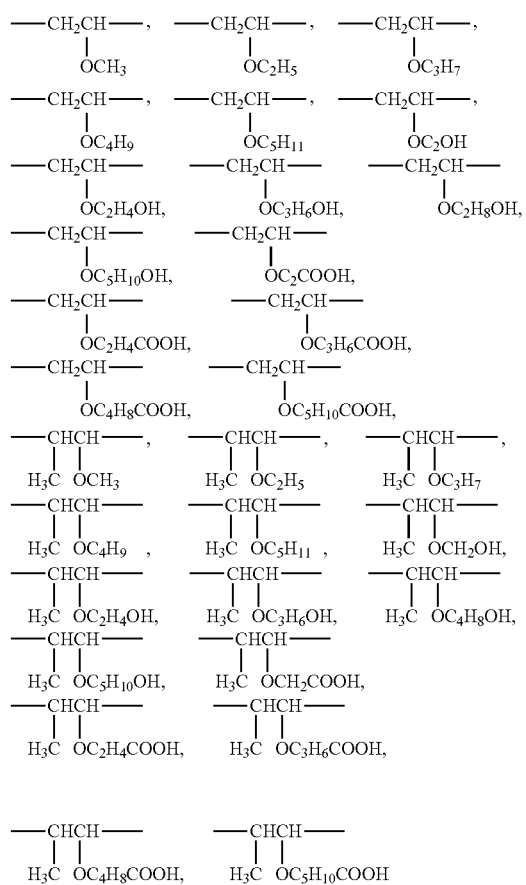

Examples of the commercial products of the fluororesin include: FLUONATE (registered trade mark) FEM-500, FEM-600, DIC GUARD F-52S, F-90, F-90M, F-90N, and AQUAFURFURAN TE-5A (all manufactured by DIC Corporation); and LUMIFLON FE4300, FE4500, FE4400, AsahiGuard AG-7105, AG-950, AG-7600, AG-7000, and AG-1100 (all manufactured by ASAHI GLASS CO., LTD.).

The water-dispersible resin may be either a homopolymer or a copolymer.

The water-dispersible resin may be a self-dispersible resin, or a resin dispersed with a dispersing agent. Among them, preferred is a water-dispersible resin obtained through emulsification polymerization or suspension polymerization or iomer or unsaturated monomer of polyester or polyurethane. In the case where the water-dispersible resin is prepared by emulsion-polymerization of the unsaturated monomers, the water-dispersible resin is obtained by performing a reaction in water to which the unsaturated monomers, a polymerization initiator, a surfactant, a chain transfer agent, a chelating agent, a pH regulator, and the like are added.

<<Unsaturated Monomer>>

The unsaturated monomer is appropriately selected depending on the intended purpose without any limitation, and examples thereof include: unsaturated carboxylic acid, such as acrylic acid, methacrylic acid, itaconic acid, fumaric acid, and maleic acid; a monofunctional (meth)acrylic acid ester, such as methylmethacrylate, ethylmethacrylate, isopropylmethacrylate, n-butylmethacrylate, isobutylmethacrylate, n-amylmethacrylate, isoamylmethacrylate, n-hexylmethacrylate, 2-ethylhexylmethacrylate, octylmethacrylate, decylmethacrylate, dodecylmethacrylate, octadecylmethacrylate, cyclohexylmethacrylate, phenylmethacrylate, benzylmethacrylate, glycidylmethacrylate, 2-hydroxyethylmethacrylate, 2-hydroxypropylmethacrylate, dimethylaminoethylmethacrylate, methacryloxyethyltrimethyl ammonium salt, 3-methacryloxypropyltrimethoxysilane, methylacrylate, ethylacrylate, isopropylacrylate, n-butylacrylate, isobutylacrylate, n-amylacrylate, isoamylacrylate, n-hexylacrylate, 2-ethylhexylacrylate, octylacrylate, decylacrylate, dodecylacrylate, octadecylacrylate, cyclohexylacrylate, phenylacrylate, benzylacrylate, glycidylacrylate, 2-hydroxyethylacrylate, 2-hydroxypropylacrylate, dimethylaminoethylacrylate, and acryloxyethyltrimethyl ammonium salt; polyfunctional (meth)acrylic acid ester, such as ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,10-hexanediol dimethacrylate, neopentyl glycol dimethacrylate, dipropylene glycol dimethacrylate, polypropylene glycol dimethacrylate, polybutylene glycol dimethacrylate, 2,2'-bis(4-methacryloxydiethoxyphenyl) propane, trimethylol propane trimethacrylate, trimethylol ethane trimethacrylate, polyethylene glycol diacrylate, triethylene glycol diacrylate, 1,3-butylene glycol diacrylate, 1,4-butylene glycol diacrylate, 1,10-hexanediol diacrylate, neopentyl glycol diacrylate, 1,9-nonanediol diacrylate, polypropylene glycol diacrylate, 2,2'-bis(4-acryloxypropyloxyphenyl)propane, 2,2'-bis(4-acryloxydiethoxyphenyl)propane trimethylolpropane triacrylate, trimethylol ethane triacrylate, tetramethylol methane triacrylate, ditrimethylol tetraacrylate, tetramethylol methane tetraacrylate, pentaerythritol tetraacrylate, and dipentaerythritol hexaacrylate; (meth)acrylic acid amide, such as acryl amide, methacryl amide, N,N-dimethylacryl amide, methylene bisacryl amide, and 2-acrylamide-2-methylpropane sulfonic acid; an aromatic vinyl compound, such as styrene, α-methylstyrene, vinyltoluene, 4-t-butylstyrene, chlorostyrene, vinyl anisole, vinyl naphthalene, and divinyl benzene; a vinyl cyano compound, such as acrylonitrile, and methacrylonitrile; a vinyl compound, such as vinyl acetate, vinylidene chloride, vinyl chloride, vinyl ether, vinyl ketone, vinyl pyrrolidone, vinyl sulfonic acid or salts thereof, vinyl trimethoxy silane, and vinyl triethoxy silane; an allyl compound, such as allyl sulfonic acid and salts thereof, allyl amine, allyl chloride, diallyl amine, and diallyldimethyl ammonium salts; olefin, such as ethylene, and propylene; a diene compound, such as butadiene, and chloroprene; and oligomers, such as a styrene oligomer having a methacryloyl group, a styrene-acrylonitrile oligomer having a methacryloyl group, a methylmethacrylate oligomer having a methacryloyl group, a dimethylsiloxane oligomer having a methacryloyl group, and a polyester oligomer having an acryloyl group. These may be used alone or in combination.

<<Physical Properties of Water-Dispersible Resin>>

The average particle diameter ($D_{50}$) of the water-dispersible resin is preferably 50 nm to 200 nm. When the average particle diameter ($D_{50}$) thereof is smaller than 50 nm, viscosity of the inkjet ink of the present invention may increases. When the average particle diameter ($D_{50}$) thereof is greater than 200 nm, a resulting ink may cause poor jet stability.

The water-dispersible resin has a function of allowing the water-dispersible colorant to fix on paper, and improves the fixing ability of the water-dispersible colorant by forming a film at room temperature. For this reason, a minimum film forming temperature (MFT) of the water-dispersible resin is preferably 30° C. or lower.

The glass transition temperature of the water-dispersible resin is preferably −40° C. or higher. When a glass transition temperature of the water-dispersible resin is lower than −40° C., viscosity of a resin film increases, which may give tackiness (i.e. tackiness of the dried ink) to the recorded matter.

An amount of the water-dispersible resin contained in the inkjet ink is preferably 2% by mass to 30% by mass, more preferably 5% by mass to 25% by mass.

<Water-Dispersible Colorant>

As described above, the water-dispersible colorant is at least one selected from the group consisting of a self-dispersible pigment, a pigment dispersed with a pigment dispersing agent, and resin particles each containing a pigment.

<<Pigment>>

The pigment may be an organic pigment or an inorganic pigment. These may be used alone or in combination. Note that, the pigment may be used in combination with a dye to adjust a color tone.

—Inorganic Pigment—

The inorganic pigment is appropriately selected depending on the intended purpose without any limitation, and examples thereof include titanium oxide, iron oxide, calcium carbonate, barium sulfate, aluminum hydroxide, barium yellow, cadmium red, chrome yellow, and carbon black. These may be used alone or in combination.

As for the carbon black, carbon black having the DBP absorption number of 25 mL/100 g to 400 mL/100 g is preferable, more preferably 30 mL/100 g to 200 mL/100 g, and even more preferably 50 mL/100 g to 150 mL/100 g.

—Organic Pigment—

The organic pigment is appropriately selected depending on the intended purpose without any limitation, and examples thereof include: an azo pigment, such as azo lake, an insoluble azo pigment, a condensed azo pigment, and a chelate azo pigment; a polycyclic pigment, such as a phthalocyanine pigment, a perylene pigment, a perinone pigment, an anthraquinone pigment, a quinacridon pigment, a dioxazine pigment, an indigo pigment, a thioindigo pigment, an iso-indolinone pigment, and a quinophtharone pigment; dye chelate, such as basic dye chelate, and acid dye chelate; and others such as a nitro pigment, a nitroso pigment, and aniline black. These may be used alone or in combination. Among these organic pigment, the azo pigment and the polycyclic pigment are preferable.

Examples of the black organic pigment include: carbon black (C.I. PIGMENT BLACK 7) such as furnace black, lamp black, acetylene black, and channel black; metals such as copper, iron (C.I. PIGMENT BLACK 11), and titanium oxide; and organic pigments such as aniline black (C.I. PIGMENT BLACK 1).

Examples of the color organic pigment, other than black include: C.I. PIGMENT YELLOW 1, 3, 12, 13, 14, 17, 24, 34, 35, 37, 42 (yellow oxide), 53, 55, 74, 81, 83, 95, 97, 98, 100, 101, 104, 408, 109, 110, 117, 120, 128, 138, 150, 151, 153, and 183; C.I. PIGMENT ORANGE 5, 13, 16, 17, 36, 43, and 51; C.I. PIGMENT RED 1, 2, 3, 5, 17, 22, 23, 31, 38, 48:2, 48:2 (permanent red 2B(Ca)), 48:3, 48:4, 49:1, 52:2, 53:1, 57:1 (brilliant carmine 6B), 60:1, 63:1, 63:2, 64:1, 81, 83, 88, 101 (red ocher), 104, 105, 106, 108 (cadmium red), 112, 114, 122 (quinacridon magenta), 123, 146, 149, 166, 168, 170, 172, 177, 178, 179, 185, 190, 193, 209, and 219; C.I. PIGMENT VIOLET 1 (rhodamine lake), 3, 5:1, 16, 19, 23, and 38; C.I. PIGMENT BLUE 1, 2, 15 (phthalocyanine blue), 15:1, 15:2, 15:3 (phthalocyanine blue), 16, 17:1, 56, 60, 63; and C.I. PIGMENT GREEN 1, 4, 7, 8, 10, 17, 18, and 36.

The BET specific surface area of the pigment is preferably 10 m$^2$/g to 1,500 m$^2$/g, more preferably 20 m$^2$/g to 600 m$^2$/g, and even more preferably 50 m$^2$/g to 300 m$^2$/g.

Note that, the BET specific surface area of the pigment can be measured by a nitrogen gas absorption method.

A method for adjusting the BET specific surface area of the pigment is appropriately selected depending on the intended purpose without any limitation, and examples thereof include ball-mill pulverizing, jet-mill pulverizing, and a ultrasonic wave treatment.

As for the pigment, a composite pigment, in which an inorganic pigment is covered with an organic pigment or carbon black, may be used.

—Composite Pigment—

A method for producing the composite pigment is appropriately selected depending on the intended purpose without any limitation, and examples thereof include: a method for precipitating an organic pigment under the presence of inorganic pigment; and a mechanochemical method in which an inorganic pigment and an organic pigment are mechanically mixed and ground.

When the composite pigment is produced, a layer of an organosiloxane compound formed from polysiloxane or alkyl silane may be optionally provided between the inorganic pigment and the organic pigment to improve the adhesion between the inorganic pigment and the organic pigment.

The organic pigment constituting the composite pigment is appropriately selected depending on the intended purpose without any limitation, and examples thereof include aniline black, anthraquinone, phthalocyanine blue, phthalocyanine green, diazo, monoazo, pyranthrone, perylene, heterocyclic yellow, quinacridon, and (thio)indigoid. Among them, carbon black, a phthalocyanine-based pigment, a quinacridon-based pigment, a monoazo yellow-based pigment, a disazo yellow-based pigment, and a heterocyclic yellow pigment are preferable in view of image density.

Examples of the phthalocyanine blue include copper phthalocyanine blue and derivatives thereof (C.I. PIGMENT BLUE 15:3, 15:4), and aluminum phthalocyanine.

Examples of the quinacridon include C.I. PIGMENT ORANGE 48, C.I. PIGMENT ORANGE 49, C.I. PIGMENT RED 122, C.I. PIGMENT RED 192, C.I. PIGMENT RED 202, C.I. PIGMENT RED 206, C.I. PIGMENT RED 207, C.I. PIGMENT RED 209, C.I. PIGMENT VIOLET 19, and C.I. PIGMENT VIOLET 42.

Examples of the monoazo yellow include C.I. Pigment Yellow 74, C.I. Pigment Yellow 109, C.I. Pigment Yellow 128, and C.I. Pigment Yellow 151.

Examples of the disazo yellow include C.I. Pigment Yellow 14, C.I. Pigment Yellow 16, and C.I. Pigment Yellow 17.

Examples of the heterocyclic yellow include C.I. Pigment Yellow 117, and C.I. Pigment Yellow 138.

The inorganic pigment constituting the composite pigment is appropriately selected depending on the intended purpose without any limitation, and examples thereof include titanium dioxide, silica, alumina, iron oxide, iron hydroxide, and tin oxide.

The inorganic pigment constituting the composite pigment is preferably spherical particles.

In the case where the organic pigment of the color other than black is deposited on the inorganic pigment, the color of the inorganic pigment constituting the composite pigment is preferably clear or white. In the case where the black organic pigment or carbon black is deposited on surfaces of particles of the inorganic pigment, the color of the inorganic pigment constituting composite pigment may be black.

The average primary particle diameter of the inorganic pigment constituting the composite pigment is preferably 100 nm or smaller, more preferably 5 nm to 50 nm.

A mass ratio of the organic pigment or carbon black to the inorganic pigment in the composite pigment is preferably 1/3 to 3, more preferably 2/3 to 2. When the mass ratio is less than 1/3, sufficient image density may not be attained. When the mass ratio thereof is greater than 3, desirable transparency and color tone may not be attained.

Examples of a commercial product of the composite pigment include a silica/carbon black composite material, a silica/phthalocyanine PB15:3 composite material, a silica/disazo yellow composite material, and a silica/quinacridon PR122 composite material (all manufactured by TODA KOGYO CORPORATION).

An amount of the pigment in the inkjet ink is preferably 1% by mass to 15% by mass, more preferably 2% by mass to 10% by mass. When the amount thereof is smaller than 1% by mass, sufficient image density may not be attained. When the amount thereof is greater than 15% by mass, jet stability of a resulting ink may be impaired.

<<Self-Dispersible Pigment>>

The self-dispersible pigment is appropriately selected depending on the intended purpose without any limitation, provided that it is a pigment each surface of particles of which is modified by bonding at least one hydrophilic group directly or via other atomic group to the surface thereof, and which can be stably dispersed without a dispersing agent.

The volume average particle diameter ($D_{50}$) of the self-dispersible pigment is preferably 0.01 μm to 0.16 μm.

As for the self-dispersible pigment, it is preferred that an anionic group or a cationic group has been introduced to each surface of the particles thereof.

—Anionic Group—

The anionic group is appropriately selected depending on the intended purpose without any limitation, and examples thereof include groups represented by the following formulae: $-COO^-M^+$, $-SO_3^-M^+$, $-PO_3H^-M^+$, and $-PO_3^{2-}M^+_2$ (where $M^+$ is a proton, alkali metal ion, ammonium ion, or organic ammonium ion).

The alkali metal ion for $M^+$ is appropriately selected depending on the intended purpose without any limitation, and examples thereof include lithium ion, sodium ion, and potassium ion.

The organic ammonium ion for $M^+$ is appropriately selected depending on the intended purpose without any limitation, and examples thereof include mono-, di-, or trimethyl ammonium ion, mono-, di-, or triethyl ammonium ion, and mono-, di-, or trimethanol ammonium ion.

A method for introducing the anionic group to each surface of the particles of the pigment is appropriately selected depending on the intended purpose without any limitation, and examples thereof include: a method in which the pigment is subjected to an oxidation treatment with sodium hypochlorite; a method by sulfonation of the pigment; and a method in which the pigment is allowed to react with diazonium salt.

—Cationic Group—

The cationic group is appropriately selected depending on the intended purpose without any limitation, and examples thereof include a combination of quaternary ammonium group represented by any of the following formula with a counter ion.

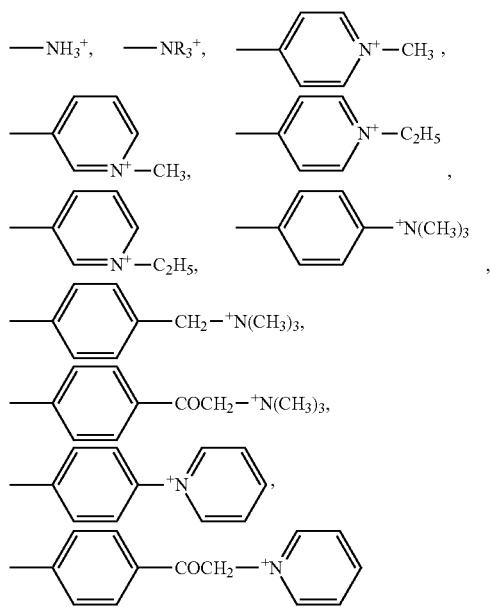

As for the self-dispersible pigment, carbon black in which cationic group has been introduced to surfaces of particles thereof can be used.

A method for introducing a cationic group to each surface of particles of the carbon black is appropriately selected depending on the intended purpose without any limitation, and examples thereof include a method in which the carbon black is subjected to a surface treatment with 3-amino-N-ethylpyridium bromide.

In the self-dispersible pigment, an ionic group may bond to a surface thereof via another atomic group.

—Another Atomic Group—

The aforementioned another atomic group is appropriately selected depending on the intended purpose without any limitation, and examples thereof include a C1-C12 alkyl group, a phenyl group, which may be substituted with a substituent, and a naphthyl group, which may be substituted with a substituent.

The ionic group bonded via the aforementioned another atom group is appropriately selected depending on the intended purpose without any limitation, and examples thereof include groups represented by the following formulae:

—CH$_2$CH$_2$COO$^-$M$^+$ (where, M$^+$ is alkali metal ion or quaternary ammonium ion)

—R—SO$_3^-$M$^+$ (where, R is a phenylene group, and M$^+$ is alkali metal ion or quaternary ammonium ion).

A geminal bisphosphonic group or geminal bisphosphonic acid salt group is preferably introduced to each surface of particles of the self-dispersible pigment. As a result of this modification, jet stability of a resulting ink can be secured.

<<Pigment Dispersing Agent>>

The pigment dispersing agent is preferably an anionic surfactant, or a nonionic surfactant having a HLB number of 10 to 20.

—Anionic Surfactant—

The anionic surfactant is appropriately selected depending on the intended purpose without any limitation, and examples thereof include polyoxyethylene alkyl ether acetic acid salt, ammonium alkylbenzene sulfonate, sodium alkylbenzene sulfonate, calcium alkylbenzene sulfonate, ammonium alkyldiphenyl ether disulfonate, sodium alkyldiphenyl ether disulfonate, calcium alkyldiphenyl ether disulfonate, dialkyl succinate sodium sulfonate, a sodium salt of naphthalene sulfonate-formalin condensate, an ammonium salt of polyoxyethylene polycyclic phenyl ether sulfuric acid ester, a sodium salt of polyoxyethylene polycyclic phenyl ether sulfuric acid ester, lauric acid salt, polyoxyethylene alkyl ether sulfate salt, and oleic acid salt. These may be used alone or in combination. Among them, sodium dioctylsulfosuccinate, and polyoxyethylene styrene phyenyl ether ammonium sulfonate are preferable.

—Nonionic Surfactant Having HLB Number of 10 to 20—

The nonionic surfactant having a HLB number of 10 to 20 is appropriately selected depending on the intended purpose without any limitation, and examples thereof include polyoxyethylene alkyl ether, polyoxyalkylene alkyl ether, polyoxyethylene polycyclic phenyl ether, sorbitan fatty acid ester, polyoxyethylene sorbitan fatty acid ester, polyoxyethylene alkylphenyl ether, polyoxyethylene alkyl amine, polyoxyethylene alkyl amide, and acetylene glycol. These may be used alone or in combination. Among them, preferred are polyoxyethylene lauryl ether, polyoxyethylene-β-naphthyl ether, polyoxyethylene sorbitan monooleate, and polyoxyethylene styrene phenyl ether.

When the pigment is dispersed using the pigment dispersing agent, a mass ratio of the pigment dispersing agent to the pigment is preferably 0.01 to 1, more preferably 0.10 to 0.50. When the mass ratio is less than 0.01, dispersibility of the pigment may be low. When the mass ratio thereof is more than 1, color breeding may occur.

A method for dispersing the pigment using the pigment dispersing agent is appropriately selected depending on the intended purpose without any limitation, and examples thereof include a method, in which a pigment dispersing agent is dissolved in water, followed by adding and dispersing the pigment therein.

A device used for dispersing the pigment is appropriately selected depending on the intended purpose without any limitation, and examples thereof include: a high-speed stirrer, such as a homogenizer; a disperser using balls, such as a bead mill and a ball mill; a kneading disperser using shear force, such as a roll mill; and a ultrasonic disperser.

Note that, it is preferred that, after dispersing the pigment, coarse particles be removed by means of a filter, or a centrifuge, if necessary.

When the pigment is dispersed using the pigment dispersing agent, the volume average particle diameter ($D_{50}$) of the pigment in water is preferably 150 nm or smaller, more preferably 100 nm or smaller. When the volume average particle diameter ($D_{50}$) thereof is greater than 150 nm, jet stability of a resulting ink may be impaired.

The pigment dispersing agent is preferably used in combination with a water-soluble resin. Use of the water-soluble resin in combination with the pigment dispersing agent can improve dispersion stability of the pigment.

—Water-Soluble Resin—

The water-soluble resin is appropriately selected depending on the intended purpose without any limitation, and examples thereof include a salt of α-olefin-maleic anhydride copolymer, a salt of styrene-(meth)acrylic acid copolymer, a salt of polyurethane, and a salt of polyester. These may be used alone or in combination.

The α-olefin-maleic anhydride copolymer, styrene-(meth) acrylic acid copolymer, polyurethane, and polyester are neutralized using an equal amount or greater, more preferably 1.0 time to 1.5 times an amount of base to improve water solubility.

—Base—

The base is appropriately selected depending on the intended purpose without any limitation, and examples thereof include: hydroxide of alkali metal, such as sodium hydroxide potassium hydroxide, and lithium hydroxide; alcohol amine, such as triethanol amine, diethanol amine, N-methyldiethanol amine, 2-amino-2-ethyl-1,3-propanediol, and choline; and others, such as ammonium, triethyl amine, and morpholine.

Examples of a commercial product of the α-olefin-maleic anhydride copolymer include T-YP110, T-YP111, T-YP112, and T-YP113 (all manufactured by SEIKO PMC CORPORATION).

Examples of a commercial product of the styrene-(meth) acryl copolymer include: JC-05 (manufactured by SEIKO PMC CORPORATION); and ARUFON (registered trade mark) UC-3900, ARUFON UC-3910, and ARUFON UC-3920 (all manufactured by TOAGOSEI CO., LTD.).

Examples of a commercial product of the polyurethane include TAKELAC (registered trade mark) W-5025, TAKELAC W-6010, and TAKELAC W-5661 (all manufactured by Mitsui Chemicals, Inc.).

Examples of a commercial product of the polyester include: NICHIGO POLYESTER (registered trade mark) W-0030, NICHIGO POLYESTER W-0005S30WO, and NICHIGO POLYESTER WR-961 (all manufactured by Nippon Synthetic Chemical Industry Co., Ltd.); and PESRESIN (registered trade mark) A-210, and PESRESIN A-520 (manufactured by TAKAMATSU OIL & FAT CO., LTD.).

An acid value of the water-soluble resin before neutralization is preferably 40 mgKOH/g to 400 mgKOH/g, more preferably 60 mgKOH/g to 350 mgKOH/g. When the acid value thereof is less than 40 mgKOH/g, dispersion stability of the pigment may be impaired. When the acid value thereof is greater than 400 mgKOH/g, jet stability of a resulting ink and dispersion stability of the pigment may be impaired.

The weight average molecular weight of the water-soluble resin before neutralization is preferably 2,0000 or smaller, more preferably 5,000 to 20,000. When the weight average molecular weight thereof is smaller than 5,000, dispersion stability of the pigment may be impaired. When the weight average molecular weight thereof is greater than 20,000, jet stability of a resulting ink and dispersion stability of the pigment may be impaired.

When the pigment is dispersed using the pigment dispersing agent, a mass ratio of the water-soluble resin, which is used in combination with the pigment dispersing agent, to the pigment is preferably 0.01 to 1, more preferably 0.05 to 0.50. When the mass ratio thereof is less than 0.01, dispersion stability of the pigment may be impaired. When the mass ratio thereof is greater than 1, jet stability of a resulting ink may be impaired.

<<Resin Particles Each Containing Pigment>>

In the resin particle containing a pigment, the pigment may be dispersed in the resin particle, or deposited on a surface of the resin particle.

A resin constituting the resin particles is appropriately selected depending on the intended purpose without any limitation, and examples thereof include a vinyl-based resin, a polyester-based resin, and a polyurethane-based resin. Among them, the vinyl-based resin and the polyester-based resin are preferable (see, for example, JP-A Nos. 2000-53897 and 2001-139849).

<Surfactant>

The surfactant is appropriately selected depending on the intended purpose without any limitation, provided that it is capable of improving leveling, and examples thereof include a fluorosurfactant, a silicone surfactant, an acetylene alcohol surfactant, an anionic surfactant, and a nonionic surfactant. These may be used alone or in combination. Among them, a silicone-based surfactant, a fluorine-based surfactant, and an acetylene alcohol-based surfactant are preferable.

<<Fluorine-Based Surfactant>>

In the fluorine-based surfactant, the number of carbon atoms substituted with a fluorogroup is preferably 2 to 16, more preferably 4 to 16. When the number of carbon atoms is less than 2, desirable leveling may not be achieved. When the number of carbon atoms is more than 16, jet stability of a resulting ink may be impaired.

The fluorine-based surfactant is appropriately selected depending on the intended purpose without any limitation, and examples thereof include a fluorine-based anionic surfactant, a fluorine-based nonionic surfactant, a fluorine-based amphoteric surfactant, and an oligomers-type fluorine-based surfactant. These may be used alone or in combination.

—Fluorine-Based Anionic Surfactant—

The fluorine-based anionic surfactant is appropriately selected depending on the intended purpose without any limitation, and examples thereof include perfluoroalkyl sulfonic acid, perfluoroalkyl sulfonic acid salt, perfluoroalkyl carboxylic acid, perfluoroalkyl carboxylic acid salt, a salt of perfluoroalkyl phosphoric acid ester, and a sulfuric acid ester salt of polyoxyalkylene ether having a perfluoroalkyloxy group in its side chain.

A counter ion of the fluorine-based anionic surfactant is appropriately selected depending on the intended purpose without any limitation, and examples thereof include lithium ion, sodium ion, potassium ion, ammonium ion, monoethanol ammonium ion, diethanol ammonium ion, and triethanol ammonium ion.

As for the fluorine-based anionic surfactant, compounds represented by the following general formulae (5) to (8) are suitably used.

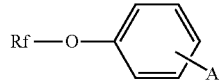

General Formula (5)

In the general formula (5), Rf represents a mixture of fluorine-containing hydrophobic groups represented by the following structural formulae; and A is $-SO_3^-M^+$, $-COO^-M^+$, or $-PO_3^-M^+$, where $M^+$ is a proton, lithium ion, sodium ion, potassium ion, ammonium ion, monoethanol ammonium ion, diethanol ammonium ion, or triethanol ammonium ion.

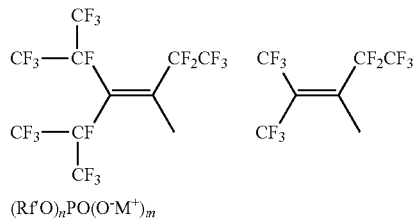

General Formula (6)

$(Rf'O)_nPO(O^-M^+)_m$

In the general formula (6), Rf' represents a fluorine-containing group represented by the following formula; $M^+$ is a proton, lithium ion, sodium ion, potassium ion, ammonium ion, monoethanol ammonium ion, diethanol ammonium ion, ortriethanol ammonium ion; n is 1 or 2; and m represents 2-n.

$F(CF_2CF_2)_nCH_2CH_2-$

In the formula above, n is an integer of 3 to 10.

$Rf'SCH_2CH_2COO-M^+$  General Formula (7)

In the general formula (7), Rf' represents the same as Rf' of the general formula (6); and $M^+$ is a proton, lithium ion, sodium ion, potassium ion, ammonium ion, monoethanol ammonium ion, diethanol ammonium ion, or triethanol ammonium ion.

$Rf'SO_3^-M^+$  General Formula (8)

In the general formula (8), Rf' represents the same as Rf' of the general formula (6); and $M^+$ is a proton, lithium ion, sodium ion, potassium ion, ammonium ion, monoethanol ammonium ion, diethanol ammonium ion, or triethanol ammonium ion.

—Fluorine-Based Nonionic Surfactant—

The fluorine-based nonionic surfactant is appropriately selected depending on the intended purpose without any limitation, and examples thereof include perfluoroalkyl phosphoric acid ester, perfluoroalkyl ethylene oxide adduct, and polyoxyalkylene ether having a perfluoroalkyloxy group in its side chain. Among them, polyoxyalkylene ether having a perfluoroalkyloxy group in its side chain is preferable because of its low foamability, and compounds represented by the following general formulae (9) to (12) are more preferable.

$CF_3CF_2(CF_2CF_2)_mCH_2CH_2O(CH_2CH_2O)_nH$  General Formula (9)

In the general formula (9), m is an integer of 0 to 10, and n is integer of 0 to 40.

$C_nF_{2n+1}CH_2CH(OH)CH_2O(CH_2CH_2O)_mR$  General Formula (10)

In the general formula (10), n is an integer of 2 to 6; m is an integer of 15 to 50; and R is a C11-C19 alkyl group or a group represented by the following general formula.

$-CH_2CH(OH)CH_2-C_pF_{2p+1}$

In the general formula above, p is an integer of 2 to 6.

$RfO(CH_2CH_2O)_nH$  General Formula (11)

In the general formula (11), Rf represents the same as Rf of the general formula (5); and n is an integer of 5 to 20.

$Rf'O(CH_2CH_2O)_nH$  General Formula (12)

In the general formula (12), Rf' represents the same as Rf' of the general formula (6); and n is an integer of 1 to 40.

A ratio of a molecular weight of the polyoxyethylene group to a molecular weight of the fluodoalkyl group in the compound represented by the general formula (9) is preferably 2.2 to 10. When the ratio thereof is less than 2.2, or more than 10, a resulting ink may not be able to achieve desirable leveling.

The compound represented by the general formula (10) is preferably compounds represented by the following chemical formulae (10-1) to (10-22) in view of leveling, more preferably compounds represented by the chemical formulae (10-1) to (10-3), and (10-14) to (10-22).

| | |
|---|---|
| $C_4F_9CH_2CH(OH)CH_2O(CH_2CH_2O)_{21}C_{12}H_{25}$ | (10-1) |
| $C_4F_9CH_2CH(OH)CH_2O(CH_2CH_2O)_{25}C_{12}H_{25}$ | (10-2) |
| $C_4F_9CH_2CH(OH)CH_2O(CH_2CH_2O)_{30}C_{12}H_{25}$ | (10-3) |
| $C_4F_9CH_2CH(OH)CH_2O(CH_2CH_2O)_{20}C_{14}H_{29}$ | (10-4) |
| $C_4F_9CH_2CH(OH)CH_2O(CH_2CH_2O)_{30}C_{14}H_{29}$ | (10-5) |
| $C_4F_9CH_2CH(OH)CH_2O(CH_2CH_2O)_{20}C_{16}H_{33}$ | (10-6) |
| $C_4F_9CH_2CH(OH)CH_2O(CH_2CH_2O)_{23}C_{16}H_{33}$ | (10-7) |
| $C_4F_9CH_2CH(OH)CH_2O(CH_2CH_2O)_{25}C_{16}H_{33}$ | (10-8) |
| $C_4F_9CH_2CH(OH)CH_2O(CH_2CH_2O)_{30}C_{16}H_{33}$ | (10-9) |
| $C_4F_9CH_2CH(OH)CH_2O(CH_2CH_2O)_{40}C_{16}H_{33}$ | (10-10) |
| $C_4F_9CH_2CH(OH)CH_2O(CH_2CH_2O)_{20}C_{18}H_{37}$ | (10-11) |
| $C_4F_9CH_2CH(OH)CH_2O(CH_2CH_2O)_{30}C_{18}H_{37}$ | (10-12) |
| $C_4F_9CH_2CH(OH)CH_2O(CH_2CH_2O)_{40}C_{18}H_{37}$ | (10-13) |
| $C_4F_9CH_2CH(OH)CH_2O(CH_2CH_2O)_{23}CH_2CH(OH)CH_2C_4F_9$ | (10-14) |
| $C_4F_9CH_2CH(OH)CH_2O(CH_2CH_2O)_{35}CH_2CH(OH)CH_2C_4F_9$ | (10-15) |
| $C_4F_9CH_2CH(OH)CH_2O(CH_2CH_2O)_{45}CH_2CH(OH)CH_2C_4F_9$ | (10-16) |
| $C_6F_{13}CH_2CH(OH)CH_2O(CH_2CH_2O)_{21}C_{12}H_{25}$ | (10-17) |
| $C_6F_{13}CH_2CH(OH)CH_2O(CH_2CH_2O)_{25}C_{12}H_{25}$ | (10-18) |

C$_6$F$_{13}$CH$_2$CH(OH)CH$_2$O(CH$_2$CH$_2$O)$_{30}$C$_{12}$H$_{25}$ (10-19)

C$_6$F$_{13}$CH$_2$CH(OH)CH$_2$O(CH$_2$CH$_2$O)$_{23}$CH$_2$CH(OH)CH$_2$C$_6$F$_{13}$ (10-20)

C$_6$F$_{13}$CH$_2$CH(OH)CH$_2$O(CH$_2$CH$_2$O)$_{35}$CH$_2$CH(OH)CH$_2$C$_6$F$_{13}$ (10-21)

C$_6$F$_{13}$CH$_2$CH(OH)CH$_2$O(CH$_2$CH$_2$O)$_{45}$CH$_2$CH(OH)CH$_2$C$_6$F$_{13}$ (10-22)

—Fluorine-Based Amphoteric Surfactant—

The fluorine-based amphoteric surfactant is preferably a compound represented by the following general formula (13).

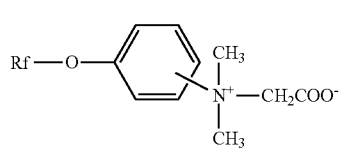

General Formula (13)

In the general formula (13), Rf represents the same as Rf of the general formula (5).

—Oligomer-Type Fluorine-Based Surfactant—

The oligomers-type fluorine-based surfactant is preferably compounds represented by the general formulae (14) to (15).

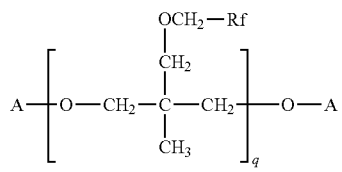

General Formula (14)

In the general formula (14), Rf is a group represented by the following general formula:

F(CF$_2$CF$_2$)$_n$CH$_2$—

(in the general formula above, n is an integer of 1 to 4);
A is a group represented by any of the following general formulae:

—COO$^-$M$^+$, —SO$_3$$^-$M$^+$, —SO$_4$$^-$M$^+$, —PO$_4$$^-$M$^+$ (in the general formulae above, M$^+$ is an alkali metal ion (e.g., sodium ion, and potassium ion) or a quaternary ammonium group (e.g., triethyl ammonium, and triethanol ammonium)); and q is an integer of 1 to 6.

In the general formula (15), Rf″ is a C2-C22 perfluoroalkyl group; m is an integer of 6 to 25; and l and n are each independently an integer of 1 to 10.

Examples of a commercial product of the fluorine-based surfactant include: SURFLON (registered trade mark) S-111, S-112, S-113, S-121, S-131, S-132, S-141, S-145 (all manufactured by AGC SEIMI CHEMICAL CO., LTD.); FLOURAD FC-93, FC-95, FC-98, FC-129, FC-135, FC-170C, FC-430, FC-431 (all manufactured by Sumitomo 3M Limited); MEGAFACE (registered trade mark) F-470, F-1405, F-474 (all manufactured by DIC Corporation); ZONYL (registered trade mark) TBS, FSP, FSA, FSN-100, FSN, FSO-100, FSO, FS-300, UR (all manufactured by Du Pont Co., Ltd.); FT-110, FT-250, FT-251, FT-400S, FT-150, FT-400SW (all manufactured by NEOS COMPANY LIMITED); and PolyFox (registered trade mark) PF-136A, PF-156A, PF-151N, PF-154, PF-159 (manufactured by Omnova Solutions, Inc.); and UNIDYNE (registered trade mark) DSN-403N (manufactured by DAIKIN INDUSTRIES, LTD.).

<<Silicone-Based Surfactant>>

The silicone-based surfactant is appropriately selected depending on the intended purpose without any limitation, and examples thereof include side chain-modified polydimethylsiloxane, both terminals-modified polydimethylsiloxane, one terminal-modified polydimethylsiloxane, and side chain and both terminals-modified polydimethylsiloxane. These may be used alone or in combination. Among them, preferred is a polyether-modified silicone-based surfactant having as a modified group, a polyoxyethylene group and/or a polyoxyethylene polyoxypropylene group.

—Polyether-Modified Silicone-Based Surfactant—

The polyether-modified silicone-based surfactant is preferably a compound represented by the general formula (16).

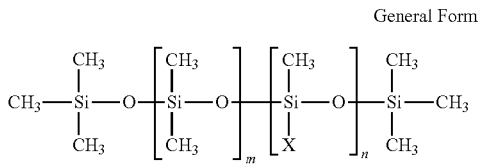

General Formula (16)

X = —R(C$_2$H$_4$O)$_a$(C$_3$H$_5$O)$_b$R′

In the general formula (16), R represents an alkylene group; R′ represents an alkyl group; and m, n, a and b each independently represent an integer.

Examples of a commercial products of the polyether-modified silicone-based surfactant include: KF-618, KF-642, and KF-643 (all manufactured by Shin-Etsu Chemical Co., Ltd.); EMALEX-SS-5602, and SS-1906EX (all manufactured by Nihon-Emulsion Co., Ltd.); FZ-2105, FZ-2118, FZ-2154, FZ-2161, FZ-2162, FZ-2163, and FZ-2164 (all manufactured by Dow Corning Toray Co., Ltd.); BYK-33, and BYK-387 (all manufactured by BYK

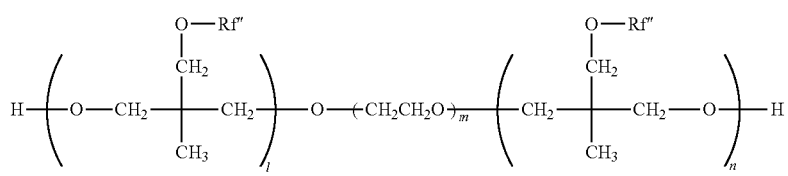

General Formula (15)

Japan K.K.); and TSF4440, TSF4452, and TSF4453 (all manufactured by Momentive Performance Materials Inc.).
<<Acetylene Alcohol-Based Surfactant>>

The acetylene alcohol-based surfactant is appropriately selected depending on the intended purpose without any limitation, but preferred are a compound represented by the following chemical formula:

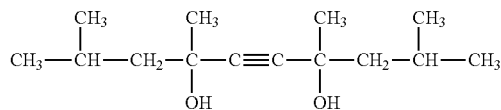 [SMILES: CC(C)CC(C)(O)C#CC(C)(O)CC(C)C]

and compounds represented by the following general formulae (17) to (18). These may be used alone or in combination.

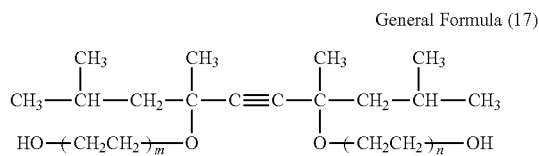
General Formula (17)

In the general formula (17), m and n each independently represent an integer.

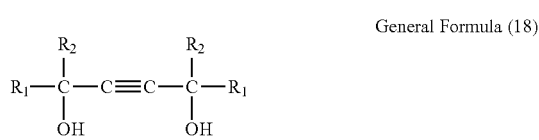
General Formula (18)

In the general formula (18), $R_1$ and $R_2$ are each independently an alkyl group.

Examples of a commercial product of the acetylene alcohol-based surfactant include: Dynol (registered trademark) 604, and Dynol 607 (both manufactured by Air Products Japan Inc.); SURFYNOL (registered trade mark) 104, SURFYNOL 420, SURFYNOL 440, and SURFYNOL SE (all manufactured by Nissin Chemical Industry Co., Ltd.); and OLFINE E1004, OLFINE E1010, OLFINE EXP.4001, OLFINE EXP.4200, OLFINE EXP.4051F, and OLFINE EXP.4123 (all manufactured by Nissin Chemical Industry Co., Ltd.).
<<Anionic Surfactant>>

The anionic surfactant is appropriately selected depending on the intended purpose without any limitation, and examples thereof include an acetic acid salt of polyoxyethylene alkylether, dodecylbenzene sulfonic acid salt, succinic ester sulfonic acid salt, lauryl acid salt, and a salt of polyoxyethylene alkyl ether sulfate. These may be used alone or in combination.
<<Nonionic Surfactant>>

The nonionic surfactant is appropriately selected depending on the intended purpose without any limitation, and examples thereof include polyoxyethylene alkyl ether, polyoxypropylene polyoxyethylene alkyl ether, polyoxyethylene alkyl ester, polyoxyethylene sorbitan fatty acid ester, polyoxyethylene alkylphenyl ether, polyoxyethylene alkyl amine, and polyoxyethylene alkyl amide. These may be used alone or in combination.

An amount of the surfactant in the inkjet ink is preferably 0.001% by mass to 5% by mass, more preferably 0.05 to 1% by mass. When the amount thereof is smaller than 0.001% by mass, a resulting ink may not be able to achieve desirable leveling. When the amount thereof is greater than 5% by mass, sufficient image density may not be attained with a resulting ink.
<Penetrating Agent>

The penetrating agent is appropriately selected depending on the intended purpose without any limitation, and examples thereof include C8-C11 polyol, and C8-C11 polyol ether. These may be used alone or in combination. The penetrating agent is preferably a compound represented by the following general formula (19), and more preferably 2-ethyl-1,3-hexanediol, and 2,2,4-trimethyl-1,3-pentanediol.

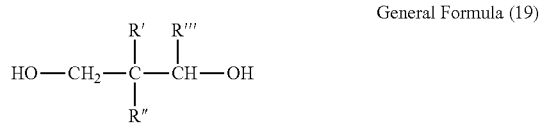
General Formula (19)

In the general formula (19), R' is a methyl group or an ethyl group; R" is a hydrogen atom or a methyl group; and R''' is an ethyl group or a propyl group.

The penetrating agent preferably has a solubility of 0.2% by mass to 5.0% by mass to water of 25° C.

The solubilities of the 2-ethyl-1,3-hexanediol and 2,2,4-trimethyl-1,3-pentanediol to water of 25° C. are 4.2% by mass and 2.0% by mass, respectively.

Other examples of the C8-C11 polyol include aliphatic diol, such as 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, and 5-hexene-1,2-diol.

Examples of the C8-C11 polyol ether include diethylene glycol monophenyl ether, ethylene glycol monophenyl ether, ethylene glycol monoallyl ether, diethylene glycol monophenyl ether, diethylene glycol monobutyl ether, propylene glycol monobutyl ether, and tetraethylene glycol chlorophenyl ether.

Other examples of the penetrating agent include lower alcohol such as ethanol.

An amount of the penetrating agent in the inkjet ink is preferably 0.1% by mass to 4.0% by mass. When the amount thereof is smaller than 0.1% by mass, color bleeding may occur. When the amount thereof is greater than 4.0% by mass, sufficient jet stability and image density may not be attained.
<Other Components>

Other components are appropriately selected depending on the intended purpose without intended purpose, and examples thereof include a pH regulator, foam inhibitor (defoaming agent), a preservative and fungicide, a chelating reagent, an anti-rust agent, an antioxidant, and an ultraviolet absorber. These may be used alone or in combination.
<<pH Regulator>>

The pH regulator is appropriately selected depending on the intended purpose without any limitation, provided that it is capable of controlling the pH to the range of 7 to 11. Examples thereof include: alcohol amine, such as diethanol amine, triethanol amine, and 2-amino-2-ethyl-1,3-propanediol; hydroxide of alkali metal, such as lithium hydroxide, sodium hydroxide, and potassium hydroxide; hydroxide of ammonium, such as ammonium hydroxide, and quaternary ammonium hydroxide; hydroxide of phosphonium, such as quaternary phosphonium hydroxide; and carbonate of alkali metal, such as lithium carbonate, sodium carbonate, and potassium carbonate. These may be used alone or in combination.

<<Foam Inhibitor>>

The foam inhibitor is appropriately selected depending on the intended purpose without any limitation, but it is preferably a compound represented by the following general formula (20).

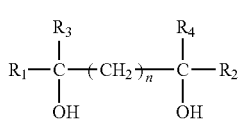

General Formula (20)

In the general formula (20), $R_1$ and $R_2$ each independently represent a C3-C6 alkyl group; $R_3$ and $R_4$ each independently represent a methyl group or an ethyl group; and n is an integer of 1 to 6.

Examples of the compound represented by the general formula (20) include 2,4,7,9-tetramethyldecane-4,7-diol, and 2,5,8,11-tetramethyldodecane-5,8-diol. Among them, 2,5,8,11-tetramethyldodecane-5,8-diol is preferable.

An amount of the foam inhibitor in the inkjet ink is preferably 0.01% by mass to 10% by mass, more preferably 0.1% by mass to 5% by mass. When the amount thereof is smaller than 0.01% by mass, an effect of inhibiting foaming may not be attained. When the amount thereof is greater than 10% by mass, jet stability of a resulting ink may be impaired.

<<Preservative and Fungicide>>

The preservative and fungicide are appropriately selected depending on the intended purpose without any limitation, and examples thereof include sodium dehydroacetate, sodium sorbate, sodium-2-pyridinethiol-1-oxide, sodium benzoate, and sodium pentachlorophenol. These may be used alone or in combination.

<<Chelating Reagent>>

The chelating reagent is appropriately selected depending on the intended purpose without any limitation, and examples thereof include sodium ethylene diaminetetraacetate, sodium nitrilotriacetate, sodium hydroxyethylethylenediaminetriacetate, sodium diethylenetriaminepentaacetate, and sodium uramildiacetate. These may be used alone or in combination.

<<Anti-Rust Agent>>

The anti-rust agent is appropriately selected depending on the intended purpose without any limitation, and examples thereof include acidic sulfite salt, sodium thiosulfate, ammonium thiodiglycolate, diisopropyl ammonium nitrite, pentaerythritol tetranitrate, and dicyclohexyl ammonium nitrite. These may be used alone or in combination.

<<Antioxidant>>

The antioxidant is appropriately selected depending on the intended purpose without any limitation, and examples thereof include: a phenol-based antioxidant, such as butylated hydroxyanisole, 2,10-di-tert-butyl-4-ethyl phenol, stearyl-β-(3,5-di-tert-butyl-4-hydroxyphenyl) propionate, 2,2'-methylenebis(4-methyl-10-tert-butylphenol), 2,2'-methylenebis(4-ethyl-10-tert-butylphenol), 4,4'-butylidenebis(3-methyl-10-tert-butylphenol), 3,9-bis[1,1-dimethyl-2-[β-(3-tert-butyl-4-hydroxy-5-methylphenyl)propionyloxy]ethyl]2,4,8,10-tetraoxaspiro[5,5]undecane, 1,1,3-tris(2-methyl-4-hydroxy-5-tert-butylphenyl)butane, 1,3,5-trimethyl-2,4,10-tris(3,5-di-tert-butyl-4-hydroxybenzyl) benzene, and tetrakis[methylene-3-(3',5'-di-tert-butyl-4'-hydroxyphenyl)propionate]methane; an amine-based antioxidant, such as phenyl-β-naphthyl amine, α-naphthyl amine, N,N'-di-sec-butyl-p-phenylene diamine, phenothiazine, N,N'-diphenyl-p-phenylene diamine, 2, 10-di-tert-butyl-p-cresol, 2,10-di-tert-butylphenol, 2,4-dimethyl-10-tert-butyl-phenol, butylhydroxyanisole, 2,2'-methylenebis(4-methyl-10-tert-butylphenol), 4,4'-butylidenebis(3-methyl-10-tert-butylphenol), 4,4'-thiobis(3-methyl-10-tert-butylphenol), tetrakis[methylene-3(3,5-di-tert-butyl-4-dihydroxyphenyl)propionate]methane, and 1,1,3-tris(2-methyl-4-hydroxy-5-tert-butylphenyl)butane; a sulfur-based antioxidant, such as dilauryl-3,3'-thiodipropionate, distearylthiodipropionate, laurylstearylthiodipropionate, dimyristyl-3,3'-thiodipropionate, distearyl-β,β'-thiodipropionate, 2-mercaptobenzoimmidazole, and dilauryl sulfide; and a phosphorous-based antioxidant, such as triphenyl phosphate, octadecyl phosphate, triisodecyl phosphate, trilauryltrithio phosphate, and trinonylphenyl phosphate. These may be used alone or in combination.

<<Ultraviolet Absorber>>

The ultraviolet absorber is appropriately selected depending on the intended purpose without any limitation, and examples thereof include: a benzophenone-based ultraviolet absorber, such as 2-hydroxy-4-n-octoxybenzophenone, 2-hydroxy-4-n-dodecyloxybenzophenone, 2,4-dihydroxybenzophenone, 2-hydroxy-4-methoxybenzophenone, and 2,2',4,4'-tetrahydroxybenzophenone; a benzotriazol-based ultraviolet absorber, such as 2-(2'-hydroxy-5'-tert-octylphenyl)benzotriazol, 2-(2'-hydroxy-5'-methylphenyl)benzotriazol, 2-(2'-hydroxy-4'-octoxyphenyl)benzotriazol, and 2-(2'-hydroxy-3'-tert-butyl-5'-methylphenyl)-5-chlorobenzotriazol; a salicylate-based ultraviolet absorber, such as phenyl salicylate, p-tert-butylphenyl salicylate, and p-octylphenyl salicylate; a cyanoacrylate-based ultraviolet absorber, such as ethyl-2-cyano-3,3'-diphenyl acrylate, methyl-2-cyano-3-methyl-3-(p-methoxyphenyl) acrylate, and butyl-2-cyano-3-methyl-3-(p-methoxyphenyl) acrylate; and a nickel complex salt-based ultraviolet absorber, such as nickelbis(octylphenyl) sulfide, nickel(II) 2,2'-thiobis(4-tert-octylferrate)-n-butyl amine, nickel(II) 2,2'-thiobis(4-tert-octylferrate)-2-ethylhexyl amine, and nickel(II) 2,2'-thiobis(4-tert-octylferrate)triethanol amine. These may be used alone or in combination.

<Physical Properties of Inkjet Ink>

The viscosity of the inkjet ink at 25° C. is preferably 5 mPa·s to 25 mPa·s. When the viscosity thereof is lower than 5 mPa·s, sufficient image density may not be attained. When the viscosity thereof is higher than 25 mPa·s, jet stability of a resulting ink may be impaired.

The viscosity of the inkjet ink at 25° C. can be measured by means of a viscometer RE-550L (manufactured by Toki Sangyo Co., Ltd.).

The pH of the inkjet ink at 25° C. is preferably 4 to 12, and in view of miscibility with the water-dispersible colorant, more preferably 6 to 11, even more preferably 7 to 10. When the pH thereof is lower than 4, or higher than 12, the dispersion state of the water-dispersible resin may be destroyed, or a molecular chains thereof may be cleaved due to hydrolysis or the like.

The pH of the inkjet ink at 25° C. can be measured by a pH meter HM-30R (manufactured by DKK-TOA CORPORATION).

The static surface tension of the inkjet ink at 25° C. is preferably 30 mN/m or less, more preferably 28 mN/m or less. When the static surface tension is greater than 30 mN/m, beading may be caused.

The dynamic surface tension of the inkjet ink with a surface lifetime of 15 ms as measured by the maximum bubble pressure method is preferably 35 mN/m or less, more preferably 33 mN/m or less. When the dynamic surface tension thereof is greater than 35 mN/m, beading may occur as an image having a large deposition amount of an inkjet ink is formed on a commercial printing sheet.

The dynamic surface tension of the inkjet ink with the surface lifetime of 15 ms as measured by the maximum bubble pressure method can be measured by means of SITA DynoTester (manufactured by SITA Messtechnik GmbH).

<Production Method of Inkjet Ink>

The inkjet ink can be produced by dispersing or dissolving, in water, a composition containing a water-dispersible colorant, a surfactant, a penetrating agent, a water-dispersible resin, polyhydric alcohol having an equilibrium moisture content of 30% by mass or greater at 23° C., 80% RH, a compound represented by the general formula (1), and at least one selected from the group consisting of compounds represented by the general formulae (2) to (4), and optionally other components.

A device for dispersing or dissolving the composition in water is appropriately selected depending on the intended purpose without any limitation, and examples thereof include a sand mill, a homogenizer, a ball mill, a paint shaker, and an ultrasonic disperser.

In the course of producing the inkjet ink, stirring and mixing may be optionally performed by means of a stirrer having a stirring blade, a magnetic stirrer, or a high-speed disperser.

(Inkjet Recording Device)

The inkjet recording device is a device containing an inkjet head configured to eject the inkjet ink, and may further contain other units, if necessary.

A system of the inkjet recording device of the present invention is appropriately selected depending on the intended purpose without any limitation, and examples thereof include a system for scanning a head, and a system for using heads that are aligned in a line.

<Inkjet Head>

The inkjet head is configured to apply stimuli (energy) to the inkjet ink and eject the inkjet ink, to thereby form an image of a recording medium.

The inkjet head is appropriately selected depending on the intended purpose without any limitation, and examples thereof include: a piezo inkjet head which uses a piezoelectric element configured to pressurize the ink in an ink channel to deform a oscillation plate constituting a wall of the ink channel, so that the internal volume of the ink channel is changed to eject ink droplets (see JP-A No. 02-51734); a thermal inkjet head, which uses a heat-generating resistor to heat the ink in the ink channel to generate bubbles (see JP-A No. 61-59911); and an electrostatic inkjet head, in which an oscillating plate constituting a wall of an ink channel and an electrode are provided to face each other, electrostatic force generated between the oscillating plate and the electrode deforms the oscillating plate so that the internal volume of the ink channel is changed to eject ink droplets (see JP-A No. 10-71882).

The inkjet recording device may further contain a dryer configured to dry a recording medium on which an image has been formed.

The dryer is appropriately selected depending on the intended purpose without any limitation, and examples thereof include an infrared ray dryer, a microwave dryer, a roller heater, a drum heater, and a hot air heater.

The inkjet recording device may further contain a fixing device configured to fix an image formed on a recording medium.

The fixing device is appropriately selected depending on the intended purpose without any limitation, and examples thereof include a roller heater having a heated mirror surface, and a drum heater having a heated mirror surface.

It is preferred that a surface of the recording medium to which the image has been formed be brought into contact with the mirror surface (smooth surface) of the roller heater or drum heater, and heated to 100° C. to 150° C. As a result of this, glossiness of the image can be improved.

The inkjet ink is preferably housed in a container, such as an ink cartridge.

The recording medium is appropriately selected depending on the intended purpose without any limitation, and examples thereof include plain paper, glossy paper, specialty paper, a cloth, a film, an OHP sheet, and a commercial printing sheet. Among them, the commercial printing sheet is preferable because it is excellent in glossiness, and capable of inhibiting cockling and beading even when an image having a large deposition amount of an inkjet ink is formed thereon.

The commercial printing sheet is a recording medium in which a coating layer is formed on a substrate.

A pure water transfer amount of the surface of the commercial printing sheet at which the coating layer is provided is preferably 1 mL/m$^2$ to 35 mL/m$^2$, more preferably 1 mL/m$^2$ to 10 mL/m$^2$, and even more preferably 2 mL/m$^2$ to 10 mL/m$^2$, with the contact time of 100 ms. When the transfer amount is less than 1 mL/m$^2$, beading may occur as an image having a large deposition amount of the inkjet ink is formed. When the transfer amount is more than 35 mL/m$^2$, image density may be low as an image having a large deposition amount of the inkjet ink is formed.

A pure water transfer amount of a surface of the commercial printing sheet at which a coating layer is provided is preferably 3 mL/m$^2$ to 40 mL/m$^2$ with the contact time of 400 ms.

Note that, the pure water transfer amount of the surface of the commercial printing sheet at which the coating layer is provided can be measured by means of a dynamic scanning absorptometer K350 series D-type (manufactured by Kyowa Co., Ltd.). Moreover, the pure water transfer amount with the contact time of 100 ms can be determined by interpolating the measuring values of the pure water transfer amounts of adjacent contact times.

Examples of a commercial product of the commercial printing sheet include: Ricoh Business Cogloss 100 (manufactured by Ricoh Company Limited); OK Top Coat+, OK Kanefuji+, SA Kanefuji+(all manufactured by Oji Paper Co., Ltd.); Super MI Dull, Aurora Coat, Space DX (all manufactured by Nippon Paper Co., Ltd.); α MAT, and Mu Coat (all manufactured by Hokuetsu Paper Mills, Ltd.); RAICHOU ART, and RAICHOU SUPER ART (all manufactured by Chuetsu Pulp & Paper Co., Ltd.); Pearl Coat N (manufactured by Mitsubishi Paper Mills, Ltd.).

Figure 2:
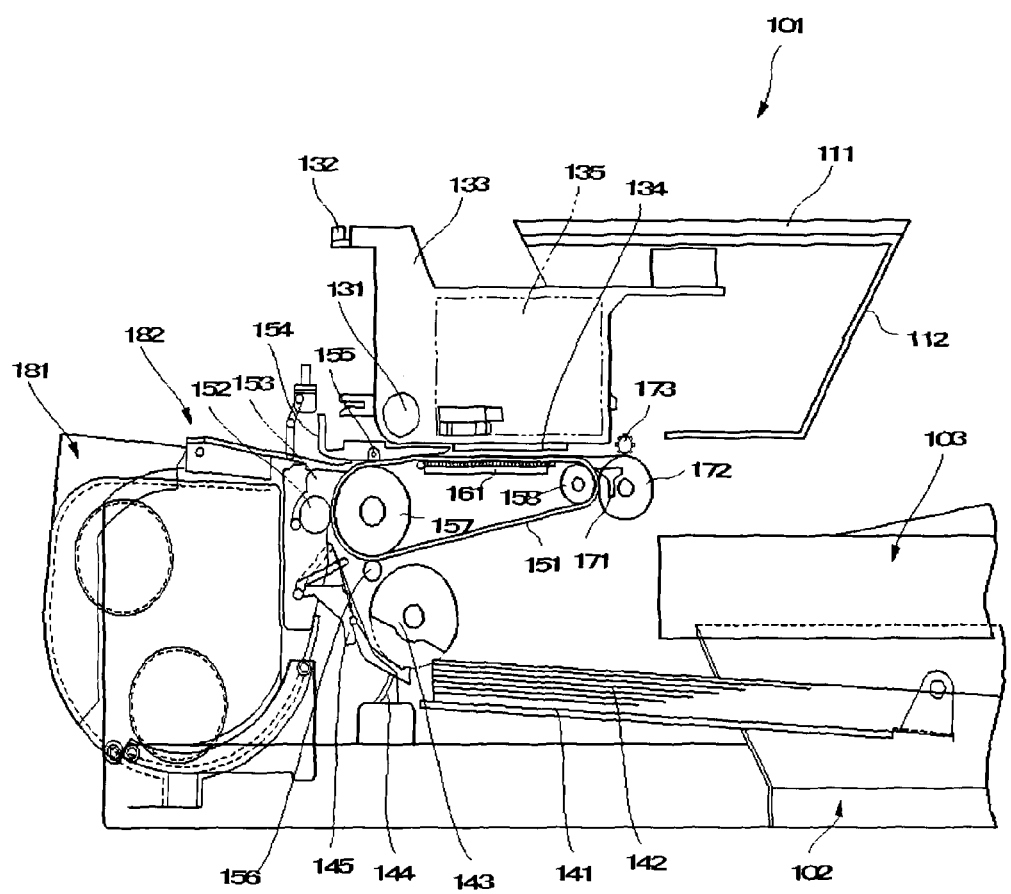
FIG. 2 is a schematic diagram for explaining an entire structure of an inkjet recording device.

Schematic diagrams (explanatory diagrams) illustrating an example of the image forming device according to the present invention are depicted in FIGS. 1 and 2.

The image forming apparatus (may be also referred to as the "inkjet recording device" hereinafter) illustrated in FIG. 1 contains a device body 101, a paper feeding tray 102 for feeding paper loaded in the device body 101, a paper discharging tray 103 for stacking the paper loaded in the device body 101 and recorded (formed) with an image, and an ink cartridge loading section 104. On the top face of the ink cartridge loading section 104, a control section 105, such as operation keys and an indicator, is arranged. The ink cartridge loading section 104 is provided with a front cover 115, which can be open and closed, to remove and load an ink cartridge 200. In FIG. 1, 111 is a top cover, and 112 is a front face cover. Instead of or in addition to the ink cartridge 200, a cartridge housing a post-treating liquid may be mounted to eject the post-treating liquid.

In the device body 101, as illustrated in FIG. 2, a carriage 133 is held to slide freely in the main scanning direction by a guide rod 131 and a stay 132, which are guide members laid across on lateral plates (not illustrated). Scanning is performed by a main scanning motor (not illustrated).

In the carriage 133, a recording head 134 including four inkjet recording heads which discharge recording ink drops for respective colors, yellow (Y), cyan (C), magenta (M), and black (Bk) is loaded, so that a plurality of ink discharge openings are arranged in the direction crossing the main scanning direction, and ink drop discharge direction is headed below.

As the inkjet recording head constituting the recording head 134, an inkjet recording head which includes a piezoelectric actuator such as a piezoelectric device, a thermal actuator which utilizes phase change due to film boiling of liquid by using an electrothermal conversion device such as a heating resistive element, a memory metal actuator which uses metal phase change due to temperature change, an electrostatic actuator which uses electrostatic power or the like as a unit for generating energy to discharge the recording ink can be used.

Further, the carriage 133 is provided with a sub tank 135 for each color to supply ink for each color to the recording head 134. The sub tank 135 is supplied and refilled with the recording ink of the present invention from the ink cartridge 200 which is loaded in the ink cartridge loading section 104 via a recording ink supply tube (not illustrated).

Meanwhile, as a paper feeding unit for feeding paper 142 laded on a paper loading section (pressure plate) 141 of the paper feeding tray 103, there are provided a semilunar roller (paper feed roller 143) which separately feed the paper 142 piece by piece from the paper loading section 141 and a separation pad 144 made of a material having a large friction coefficient, which faces the paper feed roller 143. This separation pad 144 is mounted so as to press against the side of the paper feed roller 143.

As a conveyance part to convey the paper 142 fed from this paper feed unit below the recording head 134, a conveyance belt 151 to electrostatically absorb and convey the paper 142, a counter roller 152 to carry the paper 142 fed from the paper feeding section through a guide 145 by sandwiching the paper 142 between the counter roller 152 and the conveyance belt 151, a conveyance guide 153 to change the direction of the paper 142 fed approximately vertically over the paper feeding section at an angle of about 90°, and let the paper 142 be taken along the conveyance belt 151, and an end pressure roller 155 pressed against the side of the conveyance belt 151 by a pressure member 154 are provided. Further, a charging roller 156 which is an electrification measure to charge a surface of the conveyance belt 151 is provided.

The conveyance belt 151 is an endless belt. The conveyance belt 151 is stretched between a conveyance roller 157 and a tension roller 158, and can go around in the belt conveying direction. This conveyance belt 151 has a surface layer formed of a resin material (with no resistance control) having a thickness of about 40 μm, for example, a tetrafluoroethylene-ethylene copolymer (ETFE) and serving as a paper absorbing surface, and a back layer (medium resistance layer, grounding layer) provided with resistance control by carbon, which is the same material as used in the surface layer. A guide member 161 corresponding to a printing region by the recording head 134 is arranged on the rear side of the conveyance belt 151. As a paper ejection part to eject the paper 142 recorded by the recording head 134, a separation claw 171 to separate the paper 142 from the conveyance belt 151, a paper discharging roller 172, and a paper discharging roller 173 are provided, and the paper ejection tray 103 is arranged below the paper ejection roller 172.

A double-sided paper feed unit 181 is detachably loaded on the rear face part of the apparatus body 101. The double-sided paper feed unit 181 takes in the paper 142 returned by backward rotation of the conveyance belt 151, inverts the paper 142, and feeds the paper 142 again between the counter roller 152 and the conveyance belt 151. A manual paper feeding section 182 is provided on the top face of the double-sided paper feeding unit 181.

In this inkjet recording device, the paper 142 is separately fed piece by piece from the paper feeding section. Then, the paper 142 fed approximately vertically over the paper feeding section is guided by the guide 145, and conveyed by being sandwiched between the conveyance belt 151 and the counter roller 152. Further, an end of the paper 142 is guided by the conveyance guide 153, and is pressed onto the conveyance belt 151 by the end pressure roller 155. Then, the conveyance direction of the paper 142 is changed at an angle of about 90°.

At this time, the conveyance belt 157 is charged by the charging roller 156, and therefore, the paper 142 is conveyed in the state where the paper 142 is electrostatically absorbed by the conveyance belt 151. By driving the recording head 134 correspondingly to image signals while moving the carriage 133, ink drops are discharged to the stopped paper 142 and one line is recorded. After the paper 142 is carried in a given amount, the next line is recorded. When a recording finish signal or a signal that a back end of the paper 142 reaches the recording region is received, recording operation is finished, and the paper 142 is discharged to the paper discharging tray 103.

When remaining amount near end of the recording ink inside the sub tank 135 is detected, a necessary amount of the recording ink is resupplied from the ink cartridge 200 to the sub tank 135.

In this inkjet recording device, when the recording ink in the ink cartridge 200 is used up, it is possible to disassemble the housing in the ink cartridge 200 and replace only the interior ink bag. Further, the ink cartridge 200 can supply the recording ink stably even when the ink cartridge 200 is placed vertically and has a front loading construction. Therefore, even when the installation is made in the state where a space over the top face of the device body 101 is blocked off, for example, when the device body 101 is housed in a rack, or objects are laid on the top face of the device body 101, the ink cartridge 200 can be easily replaced.

Here, descriptions have been given for the case where applied is a serial type (shuttle type) inkjet recording device in which carriage performs scanning. However, a line-type inkjet recording device using a line head can be similarly used.

EXAMPLES

Examples of the present invention will be explained hereinafter, but Examples shall not be construed as to limit the scope of the present invention. Note that, "part(s)" in the following description denotes "part(s) by mass" unless otherwise stated.

[Preparation of Dispersion Liquid of Self-Dispersible Black Pigment 1]

By means of Silverson Mixer (of Silverson), 100 g of carbon black, Black Pearls (registered trade mark) 1000 (manufactured by Cabot Corporation) having the BET specific surface area of 343 m²/g, and DBP absorption number of 105 mL/100 g, 0.1 mol of the compound represented by the following chemical formula (A), and 1 L of ion-exchanged ultra-pure water were mixed at 6,000 rpm for 30 minutes in the environment of room temperature.

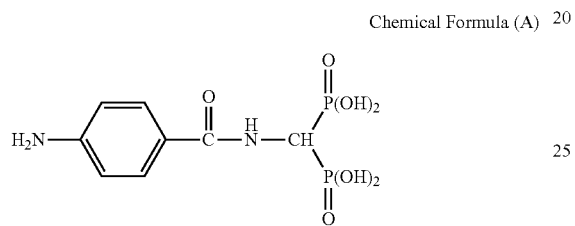

Chemical Formula (A)

When pH of the resultant was higher than 4, 0.1 mol of nitric acid was added. Next, a 20% by mass solution in which 0.1 mol of sodium nitrite was dissolved in ion-exchanged ultra-pure water was added dropwise to the resulting mixture over 15 minutes, and the resultant was heated to 60° C. with stirring and was allowed to react for 1 hour. After adjusting the pH of the mixture to 10 with a sodium hydroxide aqueous solution and stirring the resulting mixture for 30 minutes, the mixture was subjected to ultrafiltration using ion-exchanged ultra-pure water and a dialysis membrane. Next, the resultant was dispersed using ultrasonic waves, and concentrated to give a solid content of 20% by mass, to thereby obtain a dispersion liquid of Self-Dispersible Black Pigment 1. A level of the surface treatment of Self-Dispersible Black Pigment 1 was 0.75 mmol/g, the volume average particle diameter ($D_{50}$) of Self-Dispersible Black Pigment 1 was 120 nm, a sodium ion content thereof was 27,868 ppm, and a phosphorous content thereof was 2.31% by mass.

Note that, the volume average particle diameter ($D_{50}$) was measured by means of a particle size distribution analyzer Nanotrac UPA-EX150 (manufactured by Nikkiso Co., Ltd.). Moreover, the sodium ion was measured by means of an ion meter IM-32P (manufactured by DKK-TOA CORPORATION), and the phosphorous content was measured by elementary analysis.

[Preparation of Dispersion Solution of Self-Dispersible Black Pigment 2]

ProcessAll 4HV Mixer (4 L) (manufactured by Processall Inc.) was charged with 500 g of carbon black, Black Pearls 880 (manufactured by Cabot Corporation) having the BET specific surface area of 220 m²/g, and the DBP absorption number of 105 mL/100 g, 1 L of ion-exchanged ultra-pure water, and 1 mol of the compound represented by the chemical formula (A), followed by stirring and heating the mixture to 60° C. to mix the mixture at 300 rpm for 10 minutes. Next, a 20% by mass solution in which 1 mol of sodium nitrite was dissolved in ion-exchanged ultra-pure water was added dropwise over 15 minutes, followed by heating the mixture to 60° C. with stirring to thereby allow the reaction to react for 3 hours. The resulting reaction product was taken out while diluting the reaction mixture with 750 mL of ion-exchanged ultra-pure water, followed by subjecting the resultant to ultrafiltration using ion-exchanged ultra-pure water and a dialysis membrane. Next, the resultant was dispersed using ultrasonic waves, and concentrated to give a solid content of 20% by mass, to thereby obtain a dispersion liquid of Self-Dispersible Black Pigment 2. A level of the surface treatment of Self-Dispersible Black Pigment 2 was 0.5 mmol/g, the volume average particle diameter ($D_{50}$) of Self-Dispersible Black Pigment 2 was 104 nm, a sodium ion content thereof was 19,940 ppm, and a phosphorous content thereof was 2.20% by mass.

[Preparation of Dispersion Solution of Self-Dispersible Black Pigment 3]

ProcessAll 4HV Mixer (4 L) was charged with 500 g of Black Pearls 880, 1 L of ion-exchanged ultra-pure water, and 0.175 mol of the compound represented by the following chemical formula (B), followed by stirring and heating the mixture to 60° C. to mix the mixture at 300 rpm for 10 minutes. Next, a 20% by mass solution in which 0.175 mol of sodium nitrite was dissolved in ion-exchanged ultra-pure water was added dropwise over 15 minutes, followed by heating the mixture to 60° C. with stirring to thereby allow the reaction to react for 3 hours.

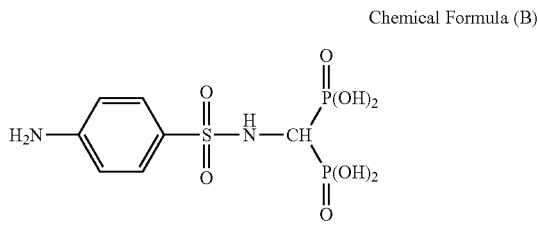

Chemical Formula (B)

The resulting reaction product was taken out while diluting the reaction mixture with 750 mL of ion-exchanged ultra-pure water, followed by subjecting the resultant to ultrafiltration using ion-exchanged ultra-pure water and a dialysis membrane. Next, the resultant was dispersed using ultrasonic waves, and then concentrated to give a solid content of 20% by mass, to thereby obtain a dispersion liquid of Self-Dispersible Black Pigment 3. A level of the surface treatment of Self-Dispersible Black Pigment 3 was 0.35 mmol/g, the volume average particle diameter ($D_{50}$) of Self-Dispersible Black Pigment 3 was 114 nm, a sodium ion content thereof was 12,792 ppm, and a phosphorous content thereof was 1.08% by mass.

[Preparation of Dispersion Solution of Self-Dispersible Magenta Pigment 1]

By means of Silverson Mixer, 100 g of Pigment Red 122 (manufactured by Sun Chemical Corporation), 0.05 mol of the compound represented by the chemical formula (B), and 1 L of ion-exchanged ultra-pure water were mixed at 6,000 rpm for 30 minutes in the environment of room temperature. Next, a 20% by mass solution in which 0.05 mol of sodium nitrite was dissolved in ion-exchanged ultra-pure water was added dropwise to the resulting mixture over 15 minutes, and the resultant was heated to 60° C. with stirring and was allowed to react for 1 hour. After adjusting the pH of the mixture to 10 with a tetramethyl ammonium hydroxide aqueous solution and stirring the resulting mixture for 30 minutes, the mixture was subjected to ultrafiltration using ion-exchanged ultra-pure water and a dialysis membrane. Next, the resultant was dispersed using ultrasonic waves, and concentrated to give a solid content of 20% by mass, to thereby obtain a dispersion liquid of Self-Dispersible Magenta Pigment 1. A level of the surface treatment of Self-Dispersible Magenta Pigment 1 was 0.50 mmol/g, the volume average particle diameter ($D_{50}$) of Self-Dispersible Magenta Pigment 1 was 111 nm, and a phosphorous content thereof was 0.26% by mass.

[Preparation of Dispersion Solution of Self-Dispersible Magenta Pigment 2]

By means of Silverson Mixer, 690 g of a dispersion liquid of surface treated Pigment Red 122 having a solid content of 14.5% by mass, SMART Magenta 3122BA (manufactured by Sensient Technologies Corporation), 0.05 mol of the compound represented by the chemical formula (B), and 500 mL of ion-exchanged ultra-pure water were mixed at 6,000 rpm for 30 minutes in the environment of room temperature. Next, a 20% by mass solution in which 0.05 mol of sodium nitrite was dissolved in ion-exchanged ultra-pure water was added dropwise to the resulting mixture over 15 minutes, the resultant was heated to 60° C. with stirring and was allowed to react for 1 hour. After adjusting the pH of the mixture to 10 with a tetramethyl ammonium hydroxide aqueous solution and stirring the resulting mixture for 30 minutes, the mixture was subjected to ultrafiltration using ion-exchanged ultra-pure water and a dialysis membrane. Next, the resultant was dispersed using ultrasonic waves, and concentrated to give a solid content of 20% by mass, to thereby obtain a dispersion liquid of Self-Dispersible Magenta Pigment 2. A level of the surface treatment of Self-Dispersible Magenta Pigment 2 was 0.50 mmol/g, the volume average particle diameter ($D_{50}$) of Self-Dispersible Magenta Pigment 2 was 106 nm, and a phosphorous content thereof was 0.25% by mass.

[Preparation of Dispersion Solution of Self-Dispersible Cyan Pigment 1]

By means of Silverson Mixer, 690 g of a dispersion liquid of surface treated Pigment Blue 15:4 having a solid content of 14.5% by mass, SMART Cyan 3154BA (manufactured by Sensient Technologies Corporation), 0.05 mol of the compound represented by the chemical formula (A), and 500 mL of ion-exchanged ultra-pure water were mixed at 6,000 rpm for 30 minutes in the environment of room temperature. Next, a 20% by mass solution in which 0.05 mol of sodium nitrite was dissolved in ion-exchanged ultra-pure water was added dropwise to the resulting mixture over 15 minutes, the resultant was heated to 60° C. with stirring and was allowed to react for 1 hour. After adjusting the pH of the mixture to 10 with a tetramethyl ammonium hydroxide aqueous solution and stirring the resulting mixture for 30 minutes, the mixture was subjected to ultrafiltration using ion-exchanged ultra-pure water and a dialysis membrane. Next, the resultant was dispersed using ultrasonic waves, and concentrated to give a solid content of 20% by mass, to thereby obtain a dispersion liquid of Self-Dispersible Cyan Pigment 1. A level of the surface treatment of Self-Dispersible Cyan Pigment 1 was 0.50 mmol/g, the volume average particle diameter ($D_{50}$) of Self-Dispersible Cyan Pigment 1 was 113 nm, and a phosphorous content thereof was 0.27% by mass.

[Preparation of Dispersion Solution of Self-Dispersible Yellow Pigment 1]

By means of Silverson Mixer, 690 g of a dispersion liquid of surface treated Pigment Yellow 74 having a solid content of 14.5% by mass, SMART Yellow 3074BA (manufactured by Sensient Technologies Corporation), 0.05 mol of the compound represented by the chemical formula (B), and 500 mL of ion-exchanged ultra-pure water were mixed at 6,000 rpm for 30 minutes in the environment of room temperature. Next, a 20% by mass solution in which 0.05 mol of sodium nitrite was dissolved in ion-exchanged ultra-pure water was added dropwise to the resulting mixture over 15 minutes, the resultant was heated to 60° C. with stirring and was allowed to react for 1 hour. After adjusting the pH of the mixture to 10 with a tetrabutyl ammonium hydroxide aqueous solution and stirring the resulting mixture for 30 minutes, the mixture was subjected to ultrafiltration using ion-exchanged ultra-pure water and a dialysis membrane. Next, the resultant was dispersed using ultrasonic waves, and concentrated to give a solid content of 20% by mass, to thereby obtain a dispersion liquid of Self-Dispersible Yellow Pigment 1. A level of the surface treatment of Self-Dispersible Yellow Pigment 1 was 0.50 mmol/g, the volume average particle diameter ($D_{50}$) of Self-Dispersible Yellow Pigment 1 was 142 nm, and a phosphorous content thereof was 0.26% by mass.

[Preparation of Dispersion Solution of Self-Dispersible Black Pigment 4]

To 3 L of a 2.5N sodium sulfate solution, 90 g of carbon black having CTAB specific area of 150 $m^2$/g, and the DBP adsorption number of 100 mL/100 g was added, and the resulting mixture was heated to 60° C. with stirring at 300 rpm to thereby allow to react for 10 hours. The resulting reaction mixture was subjected to filtration, and then the filter cake was neutralized with a sodium hydroxide aqueous solution. The resultant was subjected to ultrafiltration using ion-exchanged ultra-pure water and a dialysis membrane. After a filtration was further performed, the filter cake was washed with ion-exchanged ultra-pure water and then dried. Next, the dried filter cake was dispersed in ion-exchanged ultra-pure water to give a solid content of 20% by mass, to thereby obtain a dispersion liquid of Self-Dispersible Black Pigment 4. Self-Dispersible Black Pigment 4 had the volume average particle diameter ($D_{50}$) of 103 nm.

[Preparation of Dispersion Liquid of Magenta Pigment-Containing Resin Particles 1]

After replacing an inner atmosphere of a 1 L-flask, which was equipped with a mechanical stirrer, a thermometer, a nitrogen inlet tube, a condensation tube and dropping funnel, with nitrogen gas, 11.2 g of styrene, 2.8 g of acrylic acid, 12.0 g of lauryl methacrylate, 4.0 g of polyethylene glycol methacrylate, 4.0 g of styrene micromer, and 0.4 g of mercaptoethanol, and the mixture was heated to 65° C. Next, a mixed solution of 100.8 g of styrene, 25.2 g of acryl acid, 108.0 g of lauryl methacrylate, 36.0 g of polyethylene glycol methacrylate, 60.0 g of hydroxylethyl methacrylate, 36.0 g of styrene macromer, 3.6 g of mercaptoethanol, 2.4 g of azobismethyl valeronitrile, and 18 g of methylethyl ketone was dropped in the flask over 2.5 hours. Further, a mixture solution of 0.8 g of azobismethyl valeronitrile and 18 g of methylethyl ketone was dropped into the flask over 0.5 hours. The resulting mixture in the flask was matured at 65° C. for 1 hour, and then 0.8 g of azobismethyl valeronitrile was added, followed by maturing for another 1 hour. Next, 364 g of methylethyl ketone was added to the flask, to thereby obtain 800 g of a resin solution having a concentration of 50% by mass.

After mixing and stirring 28 g of the resin solution, 42 g of C.I. Pigment RED 122, 13.6 g of 1 mol/L potassium hydroxide aqueous solution, 20 g of methyl ethyl ketone, and 13.6 g of ion-exchanged ultra-pure water, the mixture was kneaded by means of a roll-mill to thereby obtain a paste. The obtained paste was then added to 200 g of ion-exchanged ultra-pure water, and the mixture was stirred, followed by removing the methylethyl ketone and water by means of an evaporator. The resultant was subjected to pressure filtration using a polyvinylidene fluoride membrane filter having an average opening diameter of 5.0 µm, to thereby obtain a dispersion liquid of Magenta Pigment-Containing Resin Particles 1 having a pigment solid content of 15% by mass, and a solid content of 20% by mass. Magenta Pigment-Containing Resin Particles 1 had the volume average particle diameter ($D_{50}$) of 127 nm.

[Preparation of Dispersion Liquid of Cyan Pigment-Containing Resin Particles 1]

A dispersion liquid of Cyan Pigment-Containing Resin Particles 1 was obtained in the same manner as the preparation of the dispersion liquid of Magenta Pigment-Containing Resin Particles 1, provided that C.I. Pigment Red 122 was replaced with C.I. Pigment Blue 15:3. Cyan Pigment-Containing Resin Particles 1 had the volume average particle diameter ($D_{50}$) of 93 nm.

[Preparation of Dispersion Liquid of Yellow Pigment-Containing Resin Particles 1]

A dispersion liquid of Yellow Pigment-Containing Resin Particles 1 was obtained in the same manner as the preparation of the dispersion liquid of Magenta Pigment-Containing Resin Particles 1, provided that C.I. Pigment Red 122 was replaced with C.I. Pigment Yellow 74. Yellow Pigment-Containing Resin Particles 1 had the volume average particle diameter ($D_{50}$) of 76 nm.

[Preparation of Dispersion Liquid of Black Pigment-Containing Resin Particles 1]

A dispersion liquid of Black Pigment-Containing Resin Particles 1 was obtained in the same manner as the preparation of the dispersion liquid of Magenta Pigment-Containing Resin Particles 1, provided that C.I. Pigment Red 122 was replaced with carbon black FW100 (manufactured by EVONIK DEGUSSA JAPAN CO. LTD.). Black Pigment-Containing Resin Particles 1 had the volume average particle diameter ($D_{50}$) of 104 nm.

[Preparation of Yellow Pigment 1 Dispersed with Dispersing Agent]

After dissolving 10 parts of a nonionic surfactant, NOIGEN EA-177 (polyoxyethylene styrenephenyl ether) (DAIICHI KOGYO SEIYAKU CO., LTD.), having the HLB number of 15.7 in 60 parts of ion-exchanged ultra-pure water, 30 parts of C.I. Pigment Yellow 74 (manufactured by Dainichiseika Color & Chemicals Mfg. Co., Ltd.) was added to the mixture. Next, the mixture was dispersed by a wet-type disperser, DYNO MILL KDL A-type (manufactured by WILLY A. BACHOFEN AG MASCHINENFABRIK) filled with zirconia beads having a diameter of 0.5 mm for 2 hours at 2,000 rpm. To this, 4.26 parts of a water-soluble polyurethane resin, TAKELAC W-5661 (manufactured by Mitsui Chemicals, Inc.), having an active ingredient of 35.2% by mass, acid value of 40 mgKOH/g, and weight average molecular weight of 18,000 was added and stirred, to thereby obtain a dispersion liquid of Yellow Pigment 1 dispersed with a pigment dispersing agent. The volume average particle diameter ($D_{50}$) of Yellow Pigment 1 dispersed with the pigment dispersing agent was 62 nm.

[Preparation of Magenta Pigment 1 Dispersed with Dispersing Agent]

After dissolving 10 parts of a nonionic surfactant, RT-100 (polyoxyethylene-6-naphthyl ether) (manufactured by TAKEMOTO OIL & FAT CO., LTD.), having the HLB number of 18.5 in 60 parts of ion-exchanged ultra-pure water, 30 parts of C.I. Pigment Red 122 (manufactured by Dainichiseika Color & Chemicals Mfg. Co., Ltd.) was added to the mixture. Next, the mixture was dispersed by a wet-type disperser, DYNO MILL KDL A-type (manufactured by WILLY A. BACHOFEN AG MASCHINENFABRIK) filled with zirconia beads having a diameter of 0.5 mm for 2 hours at 2,000 rpm. To this, 7.14 parts of a water-soluble styrene-(meth)acrylic acid copolymer, JC-05 (manufactured by SEIKO PMC CORPORATION), having an ingredient of 21% by mass, acid value of 170 mgKOH/g, and weight average molecular weight of 16,000 was added and stirred, to thereby obtain a dispersion liquid of Magenta Pigment 1 dispersed with a pigment dispersing agent. Magenta Pigment 1 dispersed with a pigment dispersing agent had the volume average particle diameter ($D_{50}$) of 83 nm.

[Preparation of Cyan Pigment 1 Dispersed with Dispersing Agent]

After dissolving 10 parts of a nonionic surfactant, NOIGEN EA-177 (polyoxyethylene styrenephenyl ether) (DAIICHI KOGYO SEIYAKU CO., LTD.), having the HLB number of 15.7 in 60 parts of ion-exchanged ultra-pure water, 30 parts of C.I. Pigment Blue 15:3 (manufactured by Dainichiseika Color & Chemicals Mfg. Co., Ltd.) was added to the mixture. Next, the mixture was dispersed by a wet-type disperser, DYNO MILL KDL A-type (manufactured by WILLY A. BACHOFEN AG MASCHINENFABRIK) filled with zirconia beads having a diameter of 0.5 mm for 2 hours at 2,000 rpm. To this, 5.02 parts of water-soluble polyester, NICHIGO POLYESTER W-0030 (manufactured by Nippon Synthetic Chemical Industry Co., Ltd.), having an active ingredient of 29.9% by mass, acid value of 100 mgKOH/g, and weight average molecular weight of 7,000 was added and stirred, to thereby obtain a dispersion liquid of Cyan Pigment 1 dispersed with a pigment dispersing agent. Cyan Pigment 1 dispersed with the pigment dispersing agent had the volume average particle diameter ($D_{50}$) of 78 nm.

Example 1

After mixing and stirring 17.50 parts of the dispersion liquid of Self-Dispersible Black Pigment 1, 22.56 parts of POLYZOL ROY6312 (manufactured by SHOWA DENKO K.K.) that was an acryl-silicone resin emulsion having a solid content of 39.9% by mass, the average particle diameter of 171 nm, and the minimum film-forming temperature (MFT) of 20° C., 10.00 parts of the compound represented by the chemical formula (1-1), 10.00 parts of the compound represented by the chemical formula (3-1), 10.00 parts of 3-methoxy-N,N-dimethylpropionamide, 10.00 parts of glycerin having the equilibrium moisture content of 49% by mass at 23° C., 80% RH, 2.00 parts of a penetrating agent that was 2-ethyl-1,3-hexanediol, 0.15 parts of the compound represented by the chemical formula (10-17), 0.05 parts of a fungicide that was Proxel GXL (manufactured by Arch Chemicals, Inc.), 0.60 parts of a foam inhibitor that was 2,4,7,9-tetramethyldecane-4,7-diol, 0.20 parts of a pH regulator that was 2-amino-2-ethyl-1,3-propanediol, and 16.94 parts of ion-exchanged ultra-high pure water, the resulting mixture was subjected to pressure filtration using a polyvinylidene fluoride membrane filter having an average opening diameter of 1.2 to thereby obtain an inkjet ink. The inkjet ink had the viscosity of 8.6 mPa·s, pH of 9.7, and the dynamic surface tension of 33.9 mN/m with the surface lifetime of 15 ms as measured by the maximum bubble pressure method.

Note that, the viscosity of the inkjet ink was measured at 25° C. by means of a viscometer RE-550L (manufactured by Toki Sangyo Co., Ltd.). Moreover, the pH of the inkjet ink was measured at 25° C. by means of a pH meter HM-30R (manufactured by DKK-TOA CORPORATION). Further, the dynamic surface tension of the inkjet ink with the surface life of 15 ms as measured by the maximum bubble pressure method was measured at 25° C. by means of SITA DynoTester (manufactured by SITA Messtechnik GmbH).

Example 2

After mixing and stirring 17.50 parts of the dispersion liquid of Self-Dispersible Black Pigment 2, 22.56 parts of POLYZOL ROY6312 (manufactured by SHOWA DENKO K.K.) that was an acryl-silicone resin emulsion having a solid content of 39.9% by mass, the average particle diameter of 171 nm, and the minimum film-forming temperature (MFT) of 20° C., 10.00 parts of the compound represented by the chemical formula (1-2), 10.00 parts of the compound represented by the chemical formula (3-1), 5.00 parts of 3-methoxy-N,N-dimethylpropionamide, 10.00 parts of glycerin having the equilibrium moisture content of 49% by mass at 23° C., 80% RH, 2.00 parts of a penetrating agent that was 2-ethyl-1,3-hexanediol, 0.15 parts of the compound represented by the chemical formula (10-17), 0.05 parts of a fungicide that was Proxel GXL (manufactured by Arch Chemicals, Inc.), 0.60 parts of a foam inhibitor that was 2,5,8,11-tetramethyldodecane-5,8-diol, 0.20 parts of a pH regulator that was 2-amino-2-ethyl-1,3-propanediol, and 21.94 parts of ion-exchanged ultra-pure water, the resulting mixture was subjected to pressure filtration using a polyvinylidene fluoride membrane filter having an average opening diameter of 1.2 µm, to thereby obtain an inkjet ink. The inkjet ink had the viscosity of 8.5 mPa·s, pH of 9.6, and the dynamic surface tension of 33.7 mN/m with the surface lifetime of 15 ms as measured by the maximum bubble pressure method.

Example 3

After mixing and stirring 17.50 parts of the dispersion liquid of Self-Dispersible Black Pigment 3, 22.56 parts of POLYZOL ROY6312 (manufactured by SHOWA DENKO K.K.) that was an acryl-silicone resin emulsion having a solid content of 39.9% by mass, the average particle diameter of 171 nm, and the minimum film-forming temperature (MFT) of 20° C., 10.00 parts of the compound represented by the chemical formula (1-3), 10.00 parts of the compound represented by the chemical formula (3-1), 10.00 parts of glycerin having the equilibrium moisture content of 49% by mass at 23° C., 80% RH, 5.00 parts of 1,3-butanediol having the equilibrium moisture content of 35% by mass at 23° C., 80% RH, 2.00 parts of a penetrating agent that was 2-ethyl-1,3-hexanediol, 0.15 parts of the compound represented by the chemical formula (10-17), 0.05 parts of a fungicide that was Proxel GXL (manufactured by Arch Chemicals, Inc.), 0.60 parts of a foam inhibitor that was 2,5,8,11-tetramethyldodecane-5,8-diol, 0.20 parts of a pH regulator that was 2-amino-2-ethyl-1,3-propanediol, and 21.94 parts of ion-exchanged ultra-pure water, the resulting mixture was subjected to pressure filtration using a polyvinylidene fluoride membrane filter having an average opening diameter of 1.2 µm, to thereby obtain an inkjet ink. The inkjet ink had the viscosity of 10.1 mPa·s, pH of 9.4, and the dynamic surface tension of 34.6 mN/m with the surface lifetime of 15 ms as measured by the maximum bubble pressure method.

Example 4

After mixing and stirring 17.50 parts of the dispersion liquid of Self-Dispersible Magenta Pigment 1, 20.05 parts of POLYZOL ROY6312 (manufactured by SHOWA DENKO K.K.) that was an acryl-silicone resin emulsion having a solid content of 39.9% by mass, the average particle diameter of 171 nm, and the minimum film-forming temperature (MFT) of 20° C., 10.00 parts of the compound represented by the chemical formula (1-1), 10.00 parts of the compound represented by the chemical formula (4-5), 10.00 parts of 3-methoxy-N,N-dimethylpropionamide, 15.00 parts of glycerin having the equilibrium moisture content of 49% by mass at 23° C., 80% RH, 2.00 parts of a penetrating agent that was 2-ethyl-1,3-hexanediol, 2.50 parts of a fluorine-based surfactant, ZONYL FS-300 (polyoxyethyleneperfluoroalkyl ether) (Du Pont Co., Ltd.) having an active ingredient of 40% by mass, 0.05 parts of a fungicide that was Proxel GXL (manufactured by Arch Chemicals, Inc.), 0.40 parts of a foam inhibitor that was 2,5,8,11-tetramethyldodecane-5,8-diol, 0.10 parts of a pH regulator that was 2-amino-2-ethyl-1,3-propanediol, and 12.40 parts of ion-exchanged ultra-pure water, the resulting mixture was subjected to pressure filtration using a polyvinylidene fluoride membrane filter having an average opening diameter of 1.2 µm, to thereby obtain an inkjet ink. The inkjet ink had the viscosity of 8.3 mPa·s, pH of 9.4, and the dynamic surface tension of 32.9 mN/m with the surface lifetime of 15 ms as measured by the maximum bubble pressure method.

Example 5

After mixing and stirring 37.50 parts of the dispersion liquid of Self-Dispersible Magenta Pigment 2, 30.00 parts of a fluororesin emulsion, LUMIFLON FE4300 (manufactured by ASAHI GLASS CO., LTD.) having a solid content of 50% by mass, average particle diameter of 150 nm, and MFT of 30° C. or lower, 5.00 parts of the compound represented by the chemical formula (1-1), 5.00 parts by mass of the compound represented by the chemical formula (3-1), 8.00 parts by mass of 3-methoxy-N,N-dimethylpropionamide, 10.00 parts of glycerin having the equilibrium moisture content of 49% by mass at 23° C., 80% RH, 2.00 parts by mass of a penetrating agent that was 2,2,4-trimethyl-1,3-pentanediol, 0.10 parts of the compound represented by the chemical formula (10-17), 0.05 parts by mass of a fungicide that was Proxel GXL (manufactured by Arch Chemicals, Inc.), 0.40 parts of a foam inhibitor that was 2,4,7,9-tetramethyldecane-4,7-diol, 0.10 parts of a pH regulator that was 2-amino-2-ethyl-1,3-propanediol, and 1.85 parts of ion-exchanged ultra-pure water, the resulting mixture was subjected to pressure filtration using a polyvinylidene fluoride membrane filter having an average opening diameter of 1.2 µm, to thereby obtain an inkjet ink. The inkjet ink had the viscosity of 15.2 mPa·s, pH of 9.2, and the dynamic surface tension of 34.8 mN/m with the surface lifetime of 15 ms as measured by the maximum bubble pressure method.

Example 6

After mixing and stirring 12.50 parts of the dispersion liquid of Self-Dispersible Cyan Pigment 1, 18.80 parts of POLYZOL ROY6312 (manufactured by SHOWA DENKO K.K.) that was an acryl-silicone resin emulsion having a solid content of 39.9% by mass, the average particle diameter of 171 nm, and the minimum film-forming temperature (MFT) of 20° C., 10.00 parts of the compound represented by the chemical formula (1-1), 20.00 parts of the compound represented by the chemical formula (3-1), 10.00 parts of 3-methoxy-N,N-dimethylpropionamide, 10.00 parts of glycerin having the equilibrium moisture content of 49% by mass at 23° C., 80% RH, 2.00 parts of a penetrating agent that was 2,2,4-trimethyl-1,3-pentanediol, 0.15 parts of the compound represented by the chemical formula (10-17), 0.05 parts of a fungicide that was Proxel GXL (manufactured by Arch Chemicals, Inc.), 0.60 parts of a foam inhibitor that was 2,4,7,9-tetramethyldecane-4,7-diol, 0.10 parts of a pH regulator that was 2-amino-2-ethyl-1,3-propanediol, and 15.80 parts of ion-exchanged ultra-pure water, the resulting mixture was subjected to pressure filtration using a polyvinylidene fluoride membrane filter having an average opening diameter of 1.2 μm, to thereby obtain an inkjet ink. The inkjet ink had the viscosity of 8.1 mPa·s, pH of 9.5, and the dynamic surface tension of 34.6 mN/m with the surface lifetime of 15 ms as measured by the maximum bubble pressure method.

Example 7

After mixing and stirring 12.50 parts of the dispersion liquid of Self-Dispersible Yellow Pigment 1, 18.80 parts of POLYZOL ROY6312 (manufactured by SHOWA DENKO K.K.) that was an acryl-silicone resin emulsion having a solid content of 39.9% by mass, the average particle diameter of 171 nm, and the minimum film-forming temperature (MFT) of 20° C., 10.00 parts of the compound represented by the chemical formula (1-1), 20.00 parts of the compound represented by the chemical formula (3-1), 10.00 parts of 3-methoxy-N,N-dimethylpropionamide, 10.00 parts of glycerin having the equilibrium moisture content of 49% by mass at 23° C., 80% RH, 2.00 parts of a penetrating agent that was 2-ethyl-1,3-hexanediol, 0.15 parts of the compound represented by the chemical formula (10-17), 0.05 parts of a fungicide that was Proxel GXL (manufactured by Arch Chemicals, Inc.), 0.60 parts of a foam inhibitor that was 2,5,8,11-tetramethyldodecane-5,8-diol, 0.10 parts of a pH regulator that was 2-amino-2-ethyl-1,3-propanediol, and 15.80 parts of ion-exchanged ultra-pure water, the resulting mixture was subjected to pressure filtration using a polyvinylidene fluoride membrane filter having an average opening diameter of 1.2 μm, to thereby obtain an inkjet ink. The inkjet ink had the viscosity of 8.1 mPa·s, pH of 9.3, and the dynamic surface tension of 34.7 mN/m with the surface lifetime of 15 ms as measured by the maximum bubble pressure method.

Example 8

After mixing and stirring 10.00 parts of the dispersion liquid of Self-Dispersible Cyan Pigment 1, 24.00 parts of a fluororesin emulsion, LUMIFLON FE4300 (manufactured by ASAHI GLASS CO., LTD.) having a solid content of 50% by mass, average particle diameter of 150 nm, and MFT of 30° C. or lower, 10.00 parts of the compound represented by the chemical formula (1-1), 10.00 parts of the compound represented by the chemical formula (3-1), 10.00 parts of 3-methoxy-N,N-dimethylpropionamide, 10.00 parts of glycerin having the equilibrium moisture content of 49% by mass at 23° C., 80% RH, 2.00 parts of a penetrating agent that was 2-ethyl-1,3-hexanediol, 1.25 parts of a silicone-based surfactant, a polyether-modified silicone compound KF-643 (manufactured by Shin-Etsu Chemical Co., Ltd.) having an active ingredient of 100% by mass, 0.05 parts of a fungicide that was Proxel GXL (manufactured by Arch Chemicals, Inc.), 0.40 parts of a foam inhibitor that was 2,4,7,9-tetramethyldecane-4,7-diol, 0.20 parts of a pH regulator that was 2-amino-2-ethyl-1,3-propanediol, and 22.10 parts of ion-exchanged ultra-pure water, the resulting mixture was subjected to pressure filtration using a polyvinylidene fluoride membrane filter having an average opening diameter of 1.2 μm, to thereby obtain an inkjet ink. The inkjet ink had the viscosity of 9.5 mPa·s, pH of 9.5, and the dynamic surface tension of 32.6 mN/m with the surface lifetime of 15 ms as measured by the maximum bubble pressure method.

Example 9

After mixing and stirring 7.50 parts of the dispersion liquid of Self-Dispersible Yellow Pigment 1, 30.08 parts of POLYZOL ROY6312 (manufactured by SHOWA DENKO K.K.) that was an acryl-silicone resin emulsion having a solid content of 39.9% by mass, the average particle diameter of 171 nm, and the minimum film-forming temperature (MFT) of 20° C., 10.00 parts of the compound represented by the chemical formula (1-1), 10.00 parts of the compound represented by the chemical formula (3-1), 10.00 parts of 3-methoxy-N,N-dimethylpropionamide, 10.00 parts of glycerin having the equilibrium moisture content of 49% by mass at 23° C., 80% RH, 2.00 parts of a penetrating agent that was 2-ethyl-1,3-hexanediol, 0.15 parts of the compound represented by the chemical formula (10-17), 0.05 parts of a fungicide that was Proxel GXL (manufactured by Arch Chemicals, Inc.), 0.60 parts of a foam inhibitor that was 2,5,8,11-tetramethyldodecane-5,8-diol, 0.10 parts of a pH regulator that was 2-amino-2-ethyl-1,3-propanediol, and 19.52 parts of ion-exchanged ultra-pure water, the resulting mixture was subjected to pressure filtration using a polyvinylidene fluoride membrane filter having an average opening diameter of 1.2 μm, to thereby obtain an inkjet ink. The inkjet ink had the viscosity of 8.9 mPa·s, pH of 9.2, and the dynamic surface tension of 31.5 mN/m with the surface lifetime of 15 ms as measured by the maximum bubble pressure method.

Example 10

After mixing and stirring 17.50 parts of the dispersion liquid of Self-Dispersible Black Pigment 1, 22.56 parts of POLYZOL ROY6312 (manufactured by SHOWA DENKO K.K.) that was an acryl-silicone resin emulsion having a solid content of 39.9% by mass, the average particle diameter of 171 nm, and the minimum film-forming temperature (MFT) of 20° C., 10.00 parts of the compound represented by the chemical formula (1-1), 10.00 parts of the compound represented by the chemical formula (3-1), 10.00 parts of 3-methoxy-N,N-dimethylpropionamide, 10.00 parts of glycerin having the equilibrium moisture content of 49% by mass at 23° C., 80% RH, 2.00 parts of a penetrating agent that was 2-ethyl-1,3-hexanediol, 2.00 parts of a surfactant, SOFTANOL EP-7025 (polyoxyalkylene alkyl ether) (manufactured by Nippon Shokubai Co., Ltd.) having an active ingredient of 100% by mass, 0.05 parts of a fungicide that was Proxel GXL (manufactured by Arch Chemicals, Inc.), 0.40 parts of a foam inhibitor that was 2,4,7,9-tetramethyldecane-4,7-diol, 0.20 parts of a pH regulator that was 2-amino-2-ethyl-1,3-propanediol, and 15.29 parts of ion-exchanged ultra-pure water, the resulting mixture was subjected to pressure filtration using a polyvinylidene fluoride membrane filter having an average opening diameter of 1.2 μm, to thereby obtain an inkjet ink. The inkjet ink had the viscosity of 8.7 mPa·s, pH of 9.1, and the dynamic surface tension of 38.2 mN/m with the surface lifetime of 15 ms as measured by the maximum bubble pressure method.

Example 11

After mixing and stirring 17.50 parts of the dispersion liquid of Self-Dispersible Black Pigment 1, 22.56 parts of POLYZOL ROY6312 (manufactured by SHOWA DENKO K.K.) that was an acryl-silicone resin emulsion having a solid content of 39.9% by mass, the average particle diameter of 171 nm, and the minimum film-forming temperature (MFT) of 20° C., 10.00 parts of the compound represented by the chemical formula (1-1), 10.00 parts of the compound represented by the chemical formula (2-1), 10.00 parts of 3-methoxy-N,N-dimethylpropionamide, 10.00 parts of glycerin having the equilibrium moisture content of 49% by mass at 23° C., 80% RH, 2.00 parts of a penetrating agent that was 2-ethyl-1,3-hexanediol, 3.00 parts of an acetylene alcohol-based surfactant, SURFYNOL 104E (manufactured by Nissin Chemical Industry Co., Ltd.) having an active ingredient of 50% by mass, 0.05 parts of a fungicide that was Proxel GXL (manufactured by Arch Chemicals, Inc.), 0.40 parts of a foam inhibitor that was 2,4,7,9-tetramethyldecane-4,7-diol, 0.20 parts of a pH regulator that was 2-amino-2-ethyl-1,3-propanediol, and 14.29 parts of ion-exchanged ultra-pure water, the resulting mixture was subjected to pressure filtration using a polyvinylidene fluoride membrane filter having an average opening diameter of 1.2 µm, to thereby obtain an inkjet ink. The inkjet ink had the viscosity of 8.8 mPa·s, pH of 9.6, and the dynamic surface tension of 33.4 mN/m with the surface lifetime of 15 ms as measured by the maximum bubble pressure method.

Example 12

After mixing and stirring 17.50 parts of the dispersion liquid of Self-Dispersible Black Pigment 1, 20.00 parts of a polyurethane emulsion, HYDRAN APX-101H (manufactured by DIC Corporation) having a solid content of 45% by mass, average particle diameter of 160 nm, and the minimum film forming temperature (MFT) of 20° C., 10.00 parts of the compound represented by the chemical formula (1-1), 10.00 parts of the compound represented by the chemical formula (3-1), 5.00 parts of the compound represented by the chemical formula (3-3), 10.00 parts of 3-methoxy-N,N-dimethylpropionamide, 10.00 parts of glycerin having the equilibrium moisture content of 49% by mass at 23° C., 80% RH, 2.00 parts of a penetrating agent that was 2-ethyl-1,3-hexanediol, 1.00 part of a silicone-based surfactant that was a polyether-modified silicone compound KF-643 (manufactured by Shin-Etsu Chemical Co., Ltd.) having an active ingredient of 100% by mass, 0.05 parts of a fungicide that was Proxel GXL (manufactured by Arch Chemicals, Inc.), 0.40 parts of a foam inhibitor that was 2,5,8,11-tetramethyldodecane-5,8-diol, 0.20 parts of a pH regulator that was 2-amino-2-ethyl-1,3-propanediol, and 13.85 parts of ion-exchanged ultra-pure water, the resulting mixture was subjected to pressure filtration using a polyvinylidene fluoride membrane filter having an average opening diameter of 1.2 µm, to thereby obtain an inkjet ink. The inkjet ink had the viscosity of 11.9 mPa·s, pH of 9.7, and the dynamic surface tension of 34.5 mN/m with the surface lifetime of 15 ms as measured by the maximum bubble pressure method.

Example 13

After mixing and stirring 23.33 parts of Magenta Pigment-Containing Resin Particles 1, 22.56 parts of POLYZOL ROY6312 (manufactured by SHOWA DENKO K.K.) that was an acryl-silicone resin emulsion having a solid content of 39.9% by mass, the average particle diameter of 171 nm, and the minimum film-forming temperature (MFT) of 20° C., 10.00 parts of the compound represented by the chemical formula (1-1), 10.00 parts of the compound represented by the chemical formula (3-1), 10.00 parts of 3-methoxy-N,N-dimethylpropionamide, 10.00 parts of glycerin having the equilibrium moisture content of 49% by mass at 23° C., 80% RH, 2.00 parts of a penetrating agent that was 2-ethyl-1,3-hexanediol, 0.15 parts of the compound represented by the chemical formula (10-17), 0.05 parts of a fungicide that was Proxel GXL (manufactured by Arch Chemicals, Inc.), 0.60 parts of a foam inhibitor that was 2,4,7,9-tetramethyldecane-4,7-diol, 0.20 parts of a pH regulator that was 2-amino-2-ethyl-1,3-propanediol, and 11.11 parts of ion-exchanged ultra-high pure water, the resulting mixture was subjected to pressure filtration using a polyvinylidene fluoride membrane filter having an average opening diameter of 1.2 µm, to thereby obtain an inkjet ink. The inkjet ink had the viscosity of 15.2 mPa·s, pH of 9.5, and the dynamic surface tension of 34.6 mN/m with the surface lifetime of 15 ms as measured by the maximum bubble pressure method.

Example 14

After mixing and stirring 16.67 parts of Cyan Pigment-Containing Resin Particles 1, 18.80 parts of POLYZOL ROY6312 (manufactured by SHOWA DENKO K.K.) that was an acryl-silicone resin emulsion having a solid content of 39.9% by mass, the average particle diameter of 171 nm, and the minimum film-forming temperature (MFT) of 20° C., 10.00 parts of the compound represented by the chemical formula (1-1), 20.00 parts of the compound represented by the chemical formula (3-1), 10.00 parts of 3-methoxy-N,N-dimethylpropionamide, 10.00 parts of glycerin having the equilibrium moisture content of 49% by mass at 23° C., 80% RH, 2.00 parts of a penetrating agent that was 2,2,4-trimethyl-1,3-pentanediol, 0.15 parts of the compound represented by the chemical formula (10-17), 0.05 parts of a fungicide that was Proxel GXL (manufactured by Arch Chemicals, Inc.), 0.60 parts of a foam inhibitor that was 2,4,7,9-tetramethyldecane-4,7-diol, 0.10 parts of a pH regulator that was 2-amino-2-ethyl-1,3-propanediol, and 11.64 parts of ion-exchanged ultra-high pure water, the resulting mixture was subjected to pressure filtration using a polyvinylidene fluoride membrane filter having an average opening diameter of 1.2 µm, to thereby obtain an inkjet ink. The inkjet ink had the viscosity of 15.2 mPa·s, pH of 9.3, and the dynamic surface tension of 34.8 mN/m with the surface lifetime of 15 ms as measured by the maximum bubble pressure method.

Example 15

After mixing and stirring 16.78 parts of Yellow Pigment-Containing Resin Particles 1, 18.80 parts of POLYZOL ROY6312 (manufactured by SHOWA DENKO K.K.) that was an acryl-silicone resin emulsion having a solid content of 39.9% by mass, the average particle diameter of 171 nm, and the minimum film-forming temperature (MFT) of 20° C., 10.00 parts of the compound represented by the chemical formula (1-1), 20.00 parts of the compound represented by the chemical formula (3-1), 10.00 parts of 3-methoxy-N,N-dimethylpropionamide, 10.00 parts of glycerin having the equilibrium moisture content of 49% by mass at 23° C., 80%

RH, 2.00 parts of a penetrating agent that was 2-ethyl-1,3-hexanediol, 0.15 parts of the compound represented by the chemical formula (10-17), 0.05 parts of a fungicide that was Proxel GXL (manufactured by Arch Chemicals, Inc.), 0.60 parts of a foam inhibitor that was 2,5,8,11-tetramethyldodecane-5,8-diol, 0.10 parts of a pH regulator that was 2-amino-2-ethyl-1,3-propanediol, and 11.53 parts of ion-exchanged ultra-high pure water, the resulting mixture was subjected to pressure filtration using a polyvinylidene fluoride membrane filter having an average opening diameter of 1.2 μm, to thereby obtain an inkjet ink. The inkjet ink had the viscosity of 4.5 mPa·s, pH of 9.6, and the dynamic surface tension of 34.4 mN/m with the surface lifetime of 15 ms as measured by the maximum bubble pressure method.

Example 16

After mixing and stirring 23.33 parts of Black Pigment-Containing Resin Particles 1, 22.56 parts of POLYZOL ROY6312 (manufactured by SHOWA DENKO K.K.) that was an acryl-silicone resin emulsion having a solid content of 39.9% by mass, the average particle diameter of 171 nm, and the minimum film-forming temperature (MFT) of 20° C., 10.00 parts of the compound represented by the chemical formula (1-1), 10.00 parts of the compound represented by the chemical formula (3-1), 10.00 parts of 3-methoxy-N,N-dimethylpropionamide, 10.00 parts of glycerin having the equilibrium moisture content of 49% by mass at 23° C., 80% RH, 2.00 parts of a penetrating agent that was 2-ethyl-1,3-hexanediol, 0.15 parts of the compound represented by the chemical formula (10-17), 0.05 parts of a fungicide that was Proxel GXL (manufactured by Arch Chemicals, Inc.), 0.60 parts of a foam inhibitor that was 2,4,7,9-tetramethyldecane-4,7-diol, 0.20 parts of a pH regulator that was 2-amino-2-ethyl-1,3-propanediol, and 11.11 parts of ion-exchanged ultra-high pure water, the resulting mixture was subjected to pressure filtration using a polyvinylidene fluoride membrane filter having an average opening diameter of 1.2 μm, to thereby obtain an inkjet ink. The inkjet ink had the viscosity of 15.1 mPa·s, pH of 9.5, and the dynamic surface tension of 34.2 mN/m with the surface lifetime of 15 ms as measured by the maximum bubble pressure method.

Example 17

After mixing and stirring 25.00 parts of the dispersion liquid of Self-Dispersible Black Pigment 4, 25.00 parts of a fluororesin emulsion, LUMIFLON FE4300 (manufactured by ASAHI GLASS CO., LTD.) having a solid content of 50% by mass, average particle diameter of 150 nm, and MFT of 30° C. or lower, 10.00 parts of the compound represented by the chemical formula (1-1), 10.00 parts of the compound represented by the chemical formula (3-1), 10.00 parts of 3-methoxy-N,N-dimethylpropionamide, 10.00 parts of glycerin having the equilibrium moisture content of 49% by mass at 23° C., 80% RH, 2.00 parts of a penetrating agent that was 2-ethyl-1,3-hexanediol, 0.15 parts of the compound represented by the chemical formula (10-17), 0.05 parts of a fungicide that was Proxel GXL (manufactured by Arch Chemicals, Inc.), 0.60 parts of a foam inhibitor that was 2,4,7,9-tetramethyldecane-4,7-diol, 0.20 parts of a pH regulator that was 2-amino-2-ethyl-1,3-propanediol, and 7.00 parts of ion-exchanged ultra-high pure water, the resulting mixture was subjected to pressure filtration using a polyvinylidene fluoride membrane filter having an average opening diameter of 1.2 μm, to thereby obtain an inkjet ink. The inkjet ink had the viscosity of 13.5 mPa·s, pH of 9.5, and the dynamic surface tension of 33.6 mN/m with the surface lifetime of 15 ms as measured by the maximum bubble pressure method.

Example 18

After mixing and stirring 12.17 parts of the dispersion liquid of Yellow Pigment 1 dispersed with a pigment dispersing agent, 28.00 parts of a fluororesin emulsion, LUMIFLON FE4300 (manufactured by ASAHI GLASS CO., LTD.) having a solid content of 50% by mass, average particle diameter of 150 nm, and MFT of 30° C. or lower, 10.00 parts of the compound represented by the chemical formula (1-1), 20.00 parts of the compound represented by the chemical formula (3-1), 10.00 parts of 3-methoxy-N,N-dimethylpropionamide, 10.00 parts of glycerin having the equilibrium moisture content of 49% by mass at 23° C., 80% RH, 2.00 parts of a penetrating agent that was 2-ethyl-1,3-hexanediol, 0.15 parts of the compound represented by the chemical formula (10-17), 0.05 parts of a fungicide that was Proxel GXL (manufactured by Arch Chemicals, Inc.), 0.60 parts of a foam inhibitor that was 2,4,7,9-tetramethyldecane-4,7-diol, 0.60 parts of a foam inhibitor that was 2,5,8,11-tetramethyldodecane-5,8-diol, 0.10 parts of a pH regulator that was 2-amino-2-ethyl-1,3-propanediol, and 6.33 parts of ion-exchanged ultra-high pure water, the resulting mixture was subjected to pressure filtration using a polyvinylidene fluoride membrane filter having an average opening diameter of 1.2 μm, to thereby obtain an inkjet ink. The inkjet ink had the viscosity of 14.5 mPa·s, pH of 9.7, and the dynamic surface tension of 33.4 mN/m with the surface lifetime of 15 ms as measured by the maximum bubble pressure method.

Example 19

After mixing and stirring 17.86 parts of the dispersion liquid of Magenta Pigment 1 dispersed with a pigment dispersing agent, 20.00 parts of a fluororesin emulsion, LUMIFLON FE4300 (manufactured by ASAHI GLASS CO., LTD.) having a solid content of 50% by mass, average particle diameter of 150 nm, and MFT of 30° C. or lower, 10.00 parts of the compound represented by the chemical formula (1-1), 10.00 parts of the compound represented by the chemical formula (3-1), 10.00 parts of 3-methoxy-N,N-dimethylpropionamide, 10.00 parts of glycerin having the equilibrium moisture content of 49% by mass at 23° C., 80% RH, 2.00 parts of a penetrating agent that was 2-ethyl-1,3-hexanediol, 0.15 parts of the compound represented by the chemical formula (10-17), 0.05 parts of a fungicide that was Proxel GXL (manufactured by Arch Chemicals, Inc.), 0.60 parts of a foam inhibitor that was 2,4,7,9-tetramethyldecane-4,7-diol, 0.20 parts of a pH regulator that was 2-amino-2-ethyl-1,3-propanediol, and 19.14 parts of ion-exchanged ultra-high pure water, the resulting mixture was subjected to pressure filtration using a polyvinylidene fluoride membrane filter having an average opening diameter of 1.2 μm, to thereby obtain an inkjet ink. The inkjet ink had the viscosity of 13.8 mPa·s, pH of 9.7, and the dynamic surface tension of 33.2 mN/m with the surface lifetime of 15 ms as measured by the maximum bubble pressure method.

Example 20

After mixing and stirring 12.25 parts of the dispersion liquid of Cyan Pigment 1 dispersed with a pigment dispersing agent, 28.00 parts of a fluororesin emulsion, LUMIFLON FE4300 (manufactured by ASAHI GLASS CO., LTD.)

having a solid content of 50% by mass, average particle diameter of 150 nm, and MFT of 30° C. or lower, 10.00 parts of the compound represented by the chemical formula (1-1), 20.00 parts of the compound represented by the chemical formula (3-1), 10.00 parts of 3-methoxy-N,N-dimethylpropionamide, 10.00 parts of glycerin having the equilibrium moisture content of 49% by mass at 23° C., 80% RH, 2.00 parts of a penetrating agent that was 2,2,4-trimethyl-1,3-pentanediol, 0.15 parts of the compound represented by the chemical formula (10-17), 0.05 parts of a fungicide that was Proxel GXL (manufactured by Arch Chemicals, Inc.), 0.60 parts of a foam inhibitor that was 2,4,7,9-tetramethyldecane-4,7-diol, 0.10 parts of a pH regulator that was 2-amino-2-ethyl-1,3-propanediol, and 6.85 parts of ion-exchanged ultra-high pure water, the resulting mixture was subjected to pressure filtration using a polyvinylidene fluoride membrane filter having an average opening diameter of 1.2 μm, to thereby obtain an inkjet ink. The inkjet ink had the viscosity of 14.7 mPa·s, pH of 9.8, and the dynamic surface tension of 33.2 mN/m with the surface lifetime of 15 ms as measured by the maximum bubble pressure method.

Comparative Example 1

After mixing and stirring 37.50 parts of the dispersion liquid of Self-Dispersible Black Pigment 1, 9.40 parts of POLYZOL ROY6312 (manufactured by SHOWA DENKO K.K.) that was an acryl-silicone resin emulsion having a solid content of 39.9% by mass, the average particle diameter of 171 nm, and the minimum film-forming temperature (MFT) of 20° C., 10.00 parts of the compound represented by the chemical formula (1-1), 10.00 parts of the compound represented by the chemical formula (3-1), 10.00 parts of 3-methoxy-N,N-dimethylpropionamide, 10.00 parts of glycerin having the equilibrium moisture content of 49% by mass at 23° C., 80% RH, 2.00 parts of a penetrating agent that was 2-ethyl-1,3-hexanediol, 0.10 parts of the compound represented by the chemical formula (10-17), 0.05 parts of a fungicide that was Proxel GXL (manufactured by Arch Chemicals, Inc.), 0.40 parts of a foam inhibitor that was 2,4,7,9-tetramethyldecane-4,7-diol, 0.20 parts of a pH regulator that was 2-amino-2-ethyl-1,3-propanediol, and 10.35 parts of ion-exchanged ultra-high pure water, the resulting mixture was subjected to pressure filtration using a polyvinylidene fluoride membrane filter having an average opening diameter of 1.2 μm, to thereby obtain an inkjet ink. The inkjet ink had the viscosity of 9.9 mPa·s, pH of 9.4, and the dynamic surface tension of 34.5 mN/m with the surface lifetime of 15 ms as measured by the maximum bubble pressure method.

Comparative Example 2

After mixing and stirring 37.50 parts of the dispersion liquid of Self-Dispersible Black Pigment 1, 10.00 parts of the compound represented by the chemical formula (1-1), 10.00 parts of the compound represented by the chemical formula (3-1), 10.00 parts of 3-methoxy-N,N-dimethylpropionamide, 10.00 parts of glycerin having the equilibrium moisture content of 49% by mass at 23° C., 80% RH, 2.00 parts of a penetrating agent that was 2-ethyl-1,3-hexanediol, 0.10 parts of the compound represented by the chemical formula (10-17), 0.05 parts of a fungicide that was Proxel GXL (manufactured by Arch Chemicals, Inc.), 0.40 parts of a foam inhibitor that was 2,4,7,9-tetramethyldecane-4,7-diol, 0.20 parts of a pH regulator that was 2-amino-2-ethyl-1,3-propanediol, and 19.75 parts of ion-exchanged ultra-high pure water, the resulting mixture was subjected to pressure filtration using a polyvinylidene fluoride membrane filter having an average opening diameter of 1.2 μm, to thereby obtain an inkjet ink. The inkjet ink had the viscosity of 7.2 mPa·s, pH of 9.4, and the dynamic surface tension of 33.8 mN/m with the surface lifetime of 15 ms as measured by the maximum bubble pressure method.

Comparative Example 3

After mixing and stirring 17.50 parts of the dispersion liquid of Self-Dispersible Black Pigment 1, 22.56 parts of POLYZOL ROY6312 (manufactured by SHOWA DENKO K.K.) that was an acryl-silicone resin emulsion having a solid content of 39.9% by mass, the average particle diameter of 171 nm, and the minimum film-forming temperature (MFT) of 20° C., 10.00 parts of 3-methoxy-N,N-dimethylpropionamide, 15.00 parts of glycerin having the equilibrium moisture content of 49% by mass at 23° C., 80% RH, 15.00 parts of 1,3-butanediol having the equilibrium moisture content of 35% by mass at 23° C., 80% RH, 2.00 parts of a penetrating agent that was 2-ethyl-1,3-hexanediol, 2.00 parts of a surfactant, SOFTANOL EP-7025 (polyoxyalkylene alkyl ether) (manufactured by Nippon Shokubai Co., Ltd.) having an active ingredient of 100% by mass, 0.05 parts of a fungicide that was Proxel GXL (manufactured by Arch Chemicals, Inc.), 0.40 parts of a foam inhibitor that was 2,4,7,9-tetramethyldecane-4,7-diol, 0.20 parts of a pH regulator that was 2-amino-2-ethyl-1,3-propanediol, and 15.29 parts of ion-exchanged ultra-high pure water, the resulting mixture was subjected to pressure filtration using a polyvinylidene fluoride membrane filter having an average opening diameter of 1.2 μm, to thereby obtain an inkjet ink. The inkjet ink had the viscosity of 7.6 mPa·s, pH of 9.0, and the dynamic surface tension of 38.6 mN/m with the surface lifetime of 15 ms as measured by the maximum bubble pressure method.

Comparative Example 4

After mixing and stirring 17.50 parts of the dispersion liquid of Self-Dispersible Black Pigment 1, 22.56 parts of POLYZOL ROY6312 (manufactured by SHOWA DENKO K.K.) that was an acryl-silicone resin emulsion having a solid content of 39.9% by mass, the average particle diameter of 171 nm, and the minimum film-forming temperature (MFT) of 20° C., 10.00 parts of the compound represented by the chemical formula (3-1), 10.00 parts of 3-methoxy-N,N-dimethylpropionamide, 10.00 parts of glycerin having the equilibrium moisture content of 49% by mass at 23° C., 80% RH, 10.00 parts of 1,3-butanediol having the equilibrium moisture content of 35% by mass at 23° C., 80% RH, 2.00 parts of a penetrating agent that was 2-ethyl-1,3-hexanediol, 2.00 parts of a surfactant, SOFTANOL EP-7025 (polyoxyalkylene alkyl ether) (manufactured by Nippon Shokubai Co., Ltd.) having an active ingredient of 100% by mass, 0.05 parts of a fungicide that was Proxel GXL (manufactured by Arch Chemicals, Inc.), 0.40 parts of a foam inhibitor that was 2,4,7,9-tetramethyldecane-4,7-diol, 0.20 parts of a pH regulator that was 2-amino-2-ethyl-1,3-propanediol, and 15.29 parts of ion-exchanged ultra-high pure water, the resulting mixture was subjected to pressure filtration using a polyvinylidene fluoride membrane filter having an average opening diameter of 1.2 μm, to thereby obtain an inkjet ink. The inkjet ink had the viscosity of 8.4 mPa·s, pH of 9.1, and the dynamic surface tension of 38.4 mN/m with the surface lifetime of 15 ms as measured by the maximum bubble pressure method.

Comparative Example 5

After mixing and stirring 17.50 parts of the dispersion liquid of Self-Dispersible Black Pigment 1, 22.56 parts of POLYZOL ROY6312 (manufactured by SHOWA DENKO K.K.) that was an acryl-silicone resin emulsion having a solid content of 39.9% by mass, the average particle diameter of 171 nm, and the minimum film-forming temperature (MFT) of 20° C., 10.00 parts of the compound represented by the chemical formula (1-1), 10.00 parts of 3-methoxy-N,N-dimethylpropionamide, 10.00 parts of glycerin having the equilibrium moisture content of 49% by mass at 23° C., 80% RH, 10.00 parts of 1,3-butanediol having the equilibrium moisture content of 35% by mass at 23° C., 80% RH, 2.00 parts of a penetrating agent that was 2-ethyl-1,3-hexanediol, 2.00 parts of a surfactant, SOFTANOL EP-7025 (polyoxyalkylene alkyl ether) (manufactured by Nippon Shokubai Co., Ltd.) having an active ingredient of 100% by mass, 0.05 parts of a fungicide that was Proxel GXL (manufactured by Arch Chemicals, Inc.), 0.40 parts of a foam inhibitor that was 2,4,7,9-tetramethyldecane-4,7-diol, 0.20 parts of a pH regulator that was 2-amino-2-ethyl-1,3-propanediol, and 15.29 parts of ion-exchanged ultra-high pure water, the resulting mixture was subjected to pressure filtration using a polyvinylidene fluoride membrane filter having an average opening diameter of 1.2 μm, to thereby obtain an inkjet ink. The inkjet ink had the viscosity of 8.9 mPa·s, pH of 9.2, and the dynamic surface tension of 38.3 mN/m with the surface lifetime of 15 ms as measured by the maximum bubble pressure method.

Comparative Example 6

After mixing and stirring 10.00 parts of the dispersion liquid of Self-Dispersible Cyan Pigment 1, 36.00 parts of a fluororesin emulsion, LUMIFLON FE4300 (manufactured by ASAHI GLASS CO., LTD.) having a solid content of 50% by mass, average particle diameter of 150 nm, and MFT of 30° C. or lower, 10.00 parts of the compound represented by the chemical formula (1-1), 10.00 parts of the compound represented by the chemical formula (3-1), 10.00 parts of 3-methoxy-N,N-dimethylpropionamide, 10.00 parts of glycerin having the equilibrium moisture content of 49% by mass at 23° C., 80% RH, 2.00 parts of a penetrating agent that was 2-ethyl-1,3-hexanediol, 1.25 parts of a silicone-based surfactant, a polyether-modified silicone compound KF-643 (manufactured by Shin-Etsu Chemical Co., Ltd.) having an active ingredient of 100% by mass, 0.05 parts of a fungicide that was Proxel GXL (manufactured by Arch Chemicals, Inc.), 0.40 parts of a foam inhibitor that was 2,4,7,9-tetramethyldecane-4,7-diol, 0.20 parts of a pH regulator that was 2-amino-2-ethyl-1,3-propanediol, and 10.10 parts of ion-exchanged ultra-pure water, the resulting mixture was subjected to pressure filtration using a polyvinylidene fluoride membrane filter having an average opening diameter of 1.2 μm, to thereby obtain an inkjet ink. The inkjet ink had the viscosity of 18.4 mPa·s, pH of 9.6, and the dynamic surface tension of 34.8 mN/m with the surface lifetime of 15 ms as measured by the maximum bubble pressure method.

Comparative Example 7

After mixing and stirring 35.00 parts of the dispersion liquid of Self-Dispersible Black Pigment 1, 57.40 parts of a fluororesin emulsion, LUMIFLON FE4300 (manufactured by ASAHI GLASS CO., LTD.) having a solid content of 45% by mass and average particle diameter of 160 nm, and having a solid content of 50% by mass, average particle diameter of 150 nm, and MFT of 30° C. or lower, 1.00 part of the compound represented by the chemical formula (1-1), 1.00 part of the compound represented by the chemical formula (3-1), 1.00 part of 3-methoxy-N,N-dimethylpropionamide, 1.00 part of glycerin having the equilibrium moisture content of 49% by mass at 23° C., 80% RH, 1.00 part of a penetrating agent that was 2-ethyl-1,3-hexanediol, 1.25 parts of a silicone-based surfactant that was a polyether-modified silicone compound KF-643 (manufactured by Shin-Etsu Chemical Co., Ltd.) having an active ingredient of 100% by mass, 0.05 parts of a fungicide that was Proxel GXL (manufactured by Arch Chemicals, Inc.), 0.40 parts of a foam inhibitor that was 2,5,8,11-tetramethyldodecane-5,8-diol, 0.20 parts of a pH regulator that was 2-amino-2-ethyl-1,3-propanediol, and 0.70 parts of ion-exchanged ultra-pure water, the resulting mixture was subjected to pressure filtration using a polyvinylidene fluoride membrane filter having an average opening diameter of 1.2 μm, to thereby obtain an inkjet ink. The inkjet ink had the viscosity of 14.3 mPa·s, pH of 9.4, and the dynamic surface tension of 34.1 mN/m with the surface lifetime of 15 ms as measured by the maximum bubble pressure method.

Physical properties of the inkjet inks above are presented in Table 1.

TABLE 1

| | Total amount of pigment and water-dispersible resin [mass %] | Mass ratio of water-dispersible resin to pigment | Dynamic surface tension [mN/m] |
|---|---|---|---|
| Ex. 1 | 12.5 | 2.6 | 33.9 |
| Ex. 2 | 12.5 | 2.6 | 33.7 |
| Ex. 3 | 12.5 | 2.6 | 34.6 |
| Ex. 4 | 11.5 | 2.3 | 32.9 |
| Ex. 5 | 22.5 | 2.0 | 34.8 |
| Ex. 6 | 10.0 | 3.0 | 34.6 |
| Ex. 7 | 10.0 | 3.0 | 34.7 |
| Ex. 8 | 14.0 | 6.0 | 32.6 |
| Ex. 9 | 9.5 | 8.0 | 31.5 |
| Ex. 10 | 12.5 | 2.6 | 38.2 |
| Ex. 11 | 12.5 | 2.6 | 33.4 |
| Ex. 12 | 12.5 | 2.6 | 34.5 |
| Ex. 13 | 12.5 | 2.6 | 34.6 |
| Ex. 14 | 10.0 | 3.0 | 34.8 |
| Ex. 15 | 10.0 | 3.0 | 34.4 |
| Ex. 16 | 12.5 | 2.6 | 34.2 |
| Ex. 17 | 17.5 | 2.5 | 33.6 |
| Ex. 18 | 17.5 | 4.0 | 33.8 |
| Ex. 19 | 15.0 | 2.0 | 33.4 |
| Ex. 20 | 17.5 | 4.0 | 33.2 |
| Comp. Ex. 1 | 11.2 | 0.5 | 34.5 |
| Comp. Ex. 2 | 7.5 | 0.0 | 33.8 |
| Comp. Ex. 3 | 12.5 | 2.6 | 38.6 |
| Comp. Ex. 4 | 12.5 | 2.6 | 38.4 |
| Comp. Ex. 5 | 12.5 | 2.6 | 38.3 |
| Comp. Ex. 6 | 20.0 | 9.0 | 34.8 |
| Comp. Ex. 7 | 35.7 | 4.1 | 34.1 |

In an adjusted environment where the temperature was 23° C.±0.5° C. and the relative humidity was 50%±5%, the drive voltage of a piezoelectric element was changed such that the amount of the inkjet ink deposited on a recording medium became uniform, using an inkjet printer (IPSIO GXe-5500, produced by Ricoh Company, Ltd.), and then the printing mode was set to "gloss paper-high quality printing" mode.

As for the recording medium, used was POD Gloss Coat (manufactured by Oji Paper Co., Ltd.) having a basis weight of 100 g/m$^2$, pure water transfer amount of 3.1 mL/m$^2$ with contact time of 100 ms, and pure water transfer amount of 3.5 mL/m$^2$ with contact time of 400 ms.

Image density, beading, spur smearing, cockling, glossiness, and smear fixing ability were evaluated in the following methods.

[Image Density]

A chart including a 64-point monocolor solid image "■", produced using MICROSOFT WORD 2000 (manufactured by Microsoft Corporation), was printed onto a recording medium, and the image density of the monocolor solid image area was measured by means of the densitometer X-Rite 938 (manufactured by X-Rite Co.). For the printing, the printing mode was changed from "gloss paper-high quality printing" to "no color correction." Note that, the image density of the image was judged as "A," when the image density of black was 2.0 or more, the image density of yellow was 1.25 or more, and the image density of magenta was 2.0 or more, and the image density of cyan was 2.0 or more; judged as "B," when the image density of black was 1.7 or more but less than 2.0, the image density of yellow was 1.1 or more but less than 1.25, the image density of magenta was 1.7 or more but less than 2.0, and the image density of cyan was 1.7 or more but less than 2.0; judged as "C," when the image density of black was 1.5 or more but less than 1.7, the image density of yellow was 0.95 or more but less than 1.1, the image density of magenta was 1.5 or more but less than 1.7, and the image density of cyan was 1.5 or more but less than 1.7; and judged as "D," when the image density of black was less than 1.5, the image density of yellow was less than 0.95, the image density of magenta was less than 1.5, and the image density of cyan was less than 1.5.

[Beading]

A chart including a 64-point monocolor solid image "■", produced using MICROSOFT WORD 2000 (manufactured by Microsoft Corporation), was printed onto a recording medium, and density unevenness in the monocolor solid image area was visually observed for evaluation. For the printing, the printing mode was changed from "gloss paper-high quality printing" to "no color correction." Note that, the state where there was no density unevenness was judged as "A," the state where there was a slight unevenness in the density was judged as "B," the state where there was the density unevenness was judged as "C," and the state where there was a significant degree of density unevenness was judged as "D."

[Spur Smearing]

A chart including a 64-point monocolor solid image "■", produced using MICROSOFT WORD 2000 (manufactured by Microsoft Corporation), was printed onto a recording medium, offset smearing from the solid image area to the background area caused by the spur was visually evaluated. For the printing, the printing mode was changed from "gloss paper-high quality printing" to "no color correction." Note that, the case where the offset smearing was clearly observed was judged as "III," the case where the offset smearing was slightly observed was judged as "II," and the case where the offset smearing was not observed at all was judged as "I."

[Cockling]

Soon after printing a chart including a monocolor solid image "■■■" having a size of 3 cm×15 cm, produced using MICROSOFT WORD 2000 (manufactured by Microsoft Corporation), on a recording medium, occurrence of cockling in the monocolor solid image area was visually observed. For the printing, the printing mode was changed from "gloss paper-high quality printing" to "no color correction." Note that, the case where cockling did not occur was judged as A," the case where the cockling slightly occurred was judged as "B," the case where the cockling occurred was judged as "C," and the case where the cockling significantly occurred was judged as "D."

[Glossiness]

After printing a chart including a monocolor solid image "■■■" having a size of 3 cm×15 cm, produced using MICROSOFT WORD 2000 (manufactured by Microsoft Corporation), on a recording medium, 60° specular glossiness of the monocolor solid image area and that of the unrecorded area were measured by means of a glossmeter 4501 (manufactured by BYK Gardner) to thereby evaluate glossiness. For the printing, the printing mode was changed from "gloss paper-high quality printing" to "no color correction." Note that, the case where the absolute value of the difference between the 60° specular glossiness of the monocolor solid image area and that of the unrecorded area was less than 5 was judged as "A," the case where the absolution value thereof was 5 or more but less than 10 was judged as "B," and the case where the absolute value thereof was 10 or more but less than 15 was judged as "C," and the case where the absolute value thereof was 15 or more was judged as "D."

[Smear Fixing Ability]

After printing a chart including a monocolor solid image "■■■" having a size of 3 cm×15 cm, produced using MICROSOFT WORD 2000 (manufactured by Microsoft Corporation), on a recording medium, the printed recording medium was dried for 24 hours in the adjusted environment of 23° C.±2° C., 50% RH±15% RH. Next, JIS L0803 Cotton No. 3 attached to CM-1 Clock Meter with a double-sided tape was moved against the monocolor solid image area in 10 returns, followed by measuring the density of the smear deposited on the cotton cloth and that of the background of the cotton cloth by means of X-Rite939 (manufactured by X-Rite Co.), to thereby evaluate smear fixing ability. For the printing, the printing mode was changed from "gloss paper-high quality printing" to "no color correction." Note that, the case where the difference between the density of the smear deposited on the cotton cloth and the density of the background of the cotton cloth was less than 0.05 was evaluated as "A," the case where the difference was 0.05 or more but less than 0.1 was evaluated as "B," and the case where the difference was 0.1 or more but less than 0.15 was evaluated as "C," and the case where the difference was 0.15 or more was evaluated as "D."

The evaluation results of the image density, beading, spur smearing, cockling, glossiness, and smear fixing ability are depicted in Table 2.

TABLE 2

|  | Image density | Beading | Spur smearing | Cockling | Glossiness | Smear fixing ability |
|---|---|---|---|---|---|---|
| Ex. 1 | B | A | I | A | A | A |
| Ex. 2 | B | A | I | A | A | A |

TABLE 2-continued

| | Image density | Beading | Spur smearing | Cockling | Glossiness | Smear fixing ability |
|---|---|---|---|---|---|---|
| Ex. 3 | B | A | I | A | A | A |
| Ex. 4 | B | A | I | A | B | A |
| Ex. 5 | A | B | II | B | B | A |
| Ex. 6 | B | A | I | A | A | A |
| Ex. 7 | B | A | I | A | A | A |
| Ex. 8 | C | A | I | A | A | A |
| Ex. 9 | C | A | I | A | A | A |
| Ex. 10 | C | B | I | C | B | B |
| Ex. 11 | B | A | I | A | A | A |
| Ex. 12 | B | A | I | A | A | A |
| Ex. 13 | B | A | I | B | A | A |
| Ex. 14 | B | A | I | B | A | A |
| Ex. 15 | B | A | I | B | A | A |
| Ex. 16 | B | A | I | B | A | A |
| Ex. 17 | A | A | II | C | B | B |
| Ex. 18 | A | A | I | C | A | A |
| Ex. 19 | A | A | II | C | B | B |
| Ex. 20 | A | A | II | C | A | A |
| Comp. Ex. 1 | A | B | I | B | D | C |
| Comp. Ex. 2 | B | B | I | B | D | D |
| Comp. Ex. 3 | C | D | III | D | B | B |
| Comp. Ex. 4 | C | C | III | C | B | B |
| Comp. Ex. 5 | C | C | III | C | B | B |

It was found from the results presented in Table 2 that the inkjet inks of Examples 1 to 20 had excellent image density, glossiness and smear fixing ability and could prevent occurrences of beading, spur smearing, and cockling.

On the other hand, the inkjet ink of Comparative Example 1 had low glossiness in the monocolor solid image area, as the mass ratio of the water-dispersible resin to the pigment was 0.5.

The inkjet ink of Comparative Example 2 had low glossiness in the monocolor solid image area, as the amount of the pigment contained was 7.5% by mass, and the water-dispersible resin was not contained.

The inkjet inks of Comparative Examples 3 to 5 gave low image density and caused beading, spur smearing, and cockling, because these inkjet inks did not contain the compound represented by the general formula (1) and/or the compounds represented by the general formulae (2) to (4).

The inkjet ink of Comparative Example 6 had low jet stability as the mass ratio of the water-dispersible resin to the pigment was 9.0, and therefore evaluations of the image density, beading, spur smearing, cockling, glossiness, and smear fixing ability could not be performed.

The inkjet ink of Comparative Example 7 had low jet stability as a total amount of the pigment and the water-dispersible resin was 35.7% by mass, and therefore evaluations of the image density, beading, spur smearing, cockling, glossiness, and smear fixing ability could not be performed.

Embodiments of the present invention are as follows:

<1> An inkjet ink containing:
a water-dispersible colorant;
a surfactant;
a penetrating agent;
a water-dispersible resin;
a wetting agent containing at least polyhydric alcohol having an equilibrium moisture content of 30% by mass or higher at 23° C., 80% RH;
a compound represented by the following general formula (1);
water; and
at least one selected from the group consisting of a compound represented by the following general formula (2), a compound represented by the following general formula (3), and a compound represented by the following general formula (4),
wherein the water-dispersible colorant is at least one selected from the group consisting of a self-dispersible pigment, a pigment dispersed by a pigment dispersing agent, and resin particles each containing a pigment,
wherein a total amount of the water-dispersible colorant and the water-dispersible resin is 8% by mass to 35% by mass, and
wherein a mass ratio of the water-dispersible resin to the water-dispersible colorant is 2 to 8:

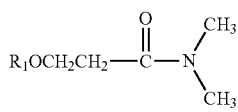

General Formula (1)

where $R_1$ is a C4-C6 alkyl group,

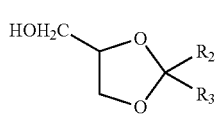

General Formula (2)

where $R_2$ is a hydrogen atom, a methyl group, or an ethyl group, and $R_3$ is a C1-C4 alkyl group,

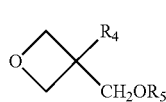

General Formula (3)

where $R_4$ is either a methyl group or an ethyl group, and $R_5$ is a hydroxyl group, a C1-C8 alkyl group, a cycloalkyl group, or an aryl group,

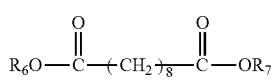

General Formula (4)

where $R_6$ and $R_7$ are each independently a C1-C8 alkyl group.

<2> The inkjet ink according to <1>, further containing a compound represented by the following chemical formula:

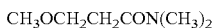

<3> The inkjet ink according to any of <1> or <2>, wherein the water-dispersible resin is an acryl-silicone resin, a fluororesin, or a combination of the acryl-silicone resin and the fluororesin.

<4> The inkjet ink according to any one of <1> to <3>, wherein the self-dispersible pigment is anionic.

<5> The inkjet ink according to any one of <1> to <4>, wherein the surfactant is a silicone-based surfactant, a fluorine-based surfactant, an acetylene alcohol-based surfactant, or any combination thereof.

<6> The inkjet ink according to any one of <1> to <5>, wherein the ink has dynamic surface tension of 35 mN/m or less at 25° C., with a surface lifetime of 15 ms as measured by the maximum bubble pressure method.

<7> An inkjet recording device, containing:
an ejecting unit configured to eject an inkjet ink,
wherein the inkjet ink is the inkjet ink according to any one of <1> to <6>.

The invention claimed is:
1. An inkjet ink comprising:
a water-dispersible colorant;
a surfactant;
a penetrating agent;
a water-dispersible resin;
a wetting agent comprising at least one polyhydric alcohol having an equilibrium moisture content of 30% by mass or higher at 23° C., 80% RH;
a compound of formula (1);
water; and
at least one selected from the group consisting of a compound of formula (2), a compound of formula (3), and a compound of formula (4),
wherein the water-dispersible colorant is at least one selected from the group consisting of a self-dispersible pigment, a pigment dispersed by a pigment dispersing agent, and resin particles each comprising a pigment,
wherein a total amount of the water-dispersible colorant and the water-dispersible resin is from 8% by mass to 35% by mass, and
wherein a mass ratio of the water-dispersible resin to the water-dispersible colorant is from 2 to 8:

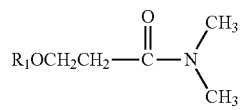

Formula (1)

wherein $R_1$ is a C4-C6 alkyl group,

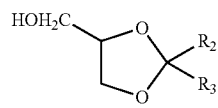

Formula (2)

wherein $R_2$ is a hydrogen atom, a methyl group, or an ethyl group, and $R_3$ is a C1-C4 alkyl group,

Formula (3)

wherein $R_4$ is either a methyl group or an ethyl group, and $R_5$ is a hydroxyl group, a C1-C8 alkyl group, a cycloalkyl group, or an aryl group, and

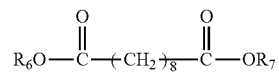

Formula (4)

wherein $R_6$ and $R_7$ are each independently a C1-C8 alkyl group.

2. The inkjet ink according to claim 1, further comprising a compound of formula:

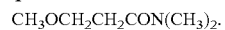

CH$_3$OCH$_2$CH$_2$CON(CH$_3$)$_2$.

3. The inkjet ink according to claim 1, wherein the water-dispersible resin is an acryl-silicone resin, a fluororesin, or a combination of the acryl-silicone resin and the fluororesin.

4. The inkjet ink according to claim 1, comprising a self-dispersible pigment, and wherein the self-dispersible pigment is anionic.

5. The inkjet ink according to claim 1, wherein the surfactant is a silicone-based surfactant, a fluorine-based surfactant, an acetylene alcohol-based surfactant, or any combination thereof.

6. The inkjet ink according to claim 1, wherein the ink has dynamic surface tension of 35 mN/m or less at 25° C., with a surface lifetime of 15 ms as measured by the maximum bubble pressure method.

7. An inkjet recording device, comprising:
an ejecting unit configured to eject an inkjet ink,
wherein the inkjet ink comprises:
a water-dispersible colorant;
a surfactant;
a penetrating agent;
a water-dispersible resin;
a wetting agent comprising at least one polyhydric alcohol having an equilibrium moisture content of 30% by mass or higher at 23° C., 80% RH;
a compound of formula (1);
water; and
at least one selected from the group consisting of a compound of formula (2), a compound of formula (3), and a compound of formula (4),
wherein the water-dispersible colorant is at least one selected from the group consisting of a self-dispersible pigment, a pigment dispersed by a pigment dispersing agent, and resin particles each comprising a pigment,
wherein a total amount of the water-dispersible colorant and the water-dispersible resin is from 8% by mass to 35% by mass, and
wherein a mass ratio of the water-dispersible resin to the water-dispersible colorant is from 2 to 8:

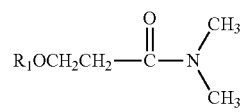

Formula (1)

wherein $R_1$ is a C4-C6 alkyl group,

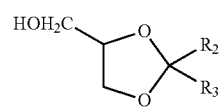

Formula (2)

wherein $R_2$ is a hydrogen atom, a methyl group, or an ethyl group, and $R_3$ is a C1-C4 alkyl group,

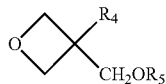

Formula (3)

wherein $R_4$ is either a methyl group or an ethyl group, and $R_5$ is a hydroxyl group, a C1-C8 alkyl group, a cycloalkyl group, or an aryl group, and

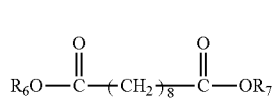

Formula (4)

wherein $R_6$ and $R_7$ are each independently a C1-C8 alkyl group.

8. The inkjet ink according to claim 1, comprising a compound of formula (2).

9. The inkjet ink according to claim 1, comprising a compound of formula (3).

10. The inkjet ink according to claim 1, comprising a compound of formula (4).

* * * * *